(12) United States Patent
Zhang

(10) Patent No.: US 11,756,586 B2
(45) Date of Patent: Sep. 12, 2023

(54) METHOD FOR SPLICING AUDIO FILE AND COMPUTER DEVICE

(71) Applicant: BEIJING DAJIA INTERNET INFORMATION TECHNOLOGY CO., LTD., Beijing (CN)

(72) Inventor: Weixiong Zhang, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/538,006

(22) Filed: Nov. 30, 2021

(65) Prior Publication Data

US 2022/0270649 A1     Aug. 25, 2022

(30) Foreign Application Priority Data

Feb. 24, 2021 (CN) .......................... 202110207967.7

(51) Int. Cl.
*G11B 27/036*     (2006.01)
*G06F 16/638*     (2019.01)

(52) U.S. Cl.
CPC .......... *G11B 27/036* (2013.01); *G06F 16/638* (2019.01)

(58) Field of Classification Search
CPC .............................. G06F 16/638; G11B 27/036
See application file for complete search history.

(56) References Cited

U.S. PATENT DOCUMENTS

| | | |
|---|---|---|
| 6,298,089 B1 | 10/2001 | Gazit |
| 2005/0066279 A1 | 3/2005 | Lebarton et al. |
| 2015/0348585 A1 | 12/2015 | Pisula et al. |
| 2016/0180885 A1 | 6/2016 | Arkenberg et al. |
| 2017/0024110 A1 | 1/2017 | Xu et al. |
| 2020/0359082 A1* | 11/2020 | Ashbacher ....... H04N 21/44016 |

FOREIGN PATENT DOCUMENTS

| | | |
|---|---|---|
| CN | 106155470 A | 11/2016 |
| CN | 106604056 A | 4/2017 |
| CN | 106782627 A | 5/2017 |
| CN | 107066115 A | 8/2017 |
| CN | 107197394 A | 9/2017 |

(Continued)

OTHER PUBLICATIONS

Chinese Office Action dated Dec. 13, 2021, from application No. 202110207967.7, 19 pages.

(Continued)

*Primary Examiner* — Girumsew Wendmagegn
(74) *Attorney, Agent, or Firm* — Foley & Lardner LLP

(57) ABSTRACT

The present disclosure provides a method for splicing an audio file and a computer device. The method includes: an intelligent terminal determines a target insertion location in response to an insertion operation, obtains an audio clip corresponding to the insertion operation, and then determines a playback duration corresponding to the audio clip, furthermore, based on the target insertion location and the playback duration, inserts a playback switching point to a source audio file corresponding to the source multimedia file, where the playback switching point is configured to switch playback between the source audio file and the audio clip during playing the source multimedia file.

16 Claims, 21 Drawing Sheets determining a target insertion location in a source multimedia file in response to an insertion operation — 100 obtaining an audio clip corresponding to the insertion operation, and determining a playback duration corresponding to the audio clip — 110 inserting, based on the target insertion location and the playback duration, a playback switching point to a source audio file corresponding to the source multimedia file, wherein the playback switching point is configured to switch playback between the source audio file and the audio clip during playing the source multimedia file — 120

(56) References Cited

FOREIGN PATENT DOCUMENTS

| CN | 107862915 A | 3/2018 |
| CN | 110797055 A | 2/2020 |
| CN | 111065001 A | 4/2020 |
| CN | 111263212 A | 6/2020 |
| CN | 111583973 A | 8/2020 |
| CN | 111726685 A | 9/2020 |
| CN | 112218130 A | 1/2021 |
| EP | 0 503 480 A2 | 9/1992 |
| EP | 1 666 967 A1 | 6/2006 |
| WO | WO-2016/038034 A1 | 3/2016 |
| WO | WO-2016038034 A1 * | 3/2016 ........... H04H 20/103 |
| WO | WO-2017/157276 A1 | 9/2017 |
| WO | WO-2018/090603 A1 | 5/2018 |

OTHER PUBLICATIONS

Extended European Search Report dated Jun. 10, 2022, issued by the European Patent Office for the corresponding EP Application No. 21217867.7, 11 pages.

Notice of Allowance dated May 23, 2022, issued by the China National Intellectual Property Administration for corresponding Chinese Patent Application No. 202110207967.7, 3 pages.

Yue-Long, Jiang, "Mobile Terminal Three Face Screen Display Content and Switching Method," Jul. 15, 2016, 6 pages.

* cited by examiner

METHOD FOR SPLICING AUDIO FILE AND COMPUTER DEVICE

CROSS-REFERENCE

The present disclosure is based on and claims priority to Chinese Patent Application No. 202110207967.7, filed on Feb. 24, 2021, in the China National Intellectual Property Administration, the entire content of which is incorporated herein by reference.

TECHNICAL FIELD

The present disclosure relates to a field of computer technology, in particular to splicing audio files.

BACKGROUND

With the popularity of multimedia technology, shooting multimedia files through user terminals, such as shooting short videos through short video applications in mobile operating systems, etc., has gradually become a daily activity for many users. Consequently, when editing and publishing multimedia files, in order to better express the content of multimedia files to obtain higher display exposure and clicks, audio files corresponding to the multimedia files are recorded at the terminal.

SUMMARY

In some arrangements, a method for splicing an audio file includes determining a target insertion location in a source multimedia file in response to an insertion operation, obtaining an audio clip corresponding to the insertion operation, determining a playback duration corresponding to the audio clip, inserting, based on the target insertion location and the playback duration, a playback switching point to a source audio file corresponding to the source multimedia file, where the playback switching point is configured to switch playback between the source audio file and the audio clip during playing the source multimedia file.

In some arrangements, an apparatus for splicing the audio file includes a first determination unit, configured to determine a target insertion location in a source multimedia file in response to an insertion operation, a second determination unit, configured to obtain an audio clip corresponding to the insertion operation and determine a playback duration corresponding to the audio clip, and a splicing unit, configured to insert, based on the target insertion duration and the playback duration, a playback switching point to a source audio file corresponding to the source multimedia file, where the playback switching point is configured to switch playback between the source audio file and the audio clip during playing the source multimedia file.

In some arrangements, a computer device includes a memory configured to store an executable instruction and a processor configured to read and execute the executable instruction stored in the memory to implement any method described herein.

In some arrangements, a non-transitory computer readable storage medium, where an instruction stored in the computer readable storage medium, when executed by a processor, causes the processor to implement any method described herein.

In some arrangements, a computer program product, which includes an executable instruction, where the executable instruction, when executed by a processor, causes the processor to implement any method described herein.

DETAILED DESCRIPTION

In a process of making and generating video or other multimedia files, there are two common ways to alter the source audio as follows.

The first way is to re-record a new recorded audio file for the whole multimedia file to replace the source audio file.

Due to the continuity of the recorded audio files, the use of the first way needs to re-record a new recorded audio file for the whole multimedia file, and cannot retain the source audio file of the multimedia file. If there is still a part of the new recorded audio file with poor effect, it is also necessary to re-record the audio file of the whole multimedia file, which causes a lot of repetitive recording operations, and then causes a lot of time wastage for users, but also reduces the user's experience satisfaction.

The second way is to process the recorded audio file accordingly by using professional audio processing software.

The use of the second way requires the professional equipment, which not only increases the operational difficulty of audio file processing, but also increases the cost of audio file processing. If professional audio processing software is installed on the terminal, as the professional audio processing software usually requires a large amount of memory, not only will the terminal run poorly or even crash due to the large amount of memory it occupies, but there is also the problem of incompatibility between the audio processing software and the terminal's operating system.

In order to solve the problem that the recorded audio file of the multimedia file in the prior art cannot be spliced with the source audio file randomly, in arrangements of the present disclosure, the intelligent terminal determines a target insertion location in response to an insertion operation, and after obtaining an audio clip, inserts, based on the target insertion and a playback duration corresponding to the audio clip, a playback switching point to a source audio file corresponding to the source multimedia file, where the playback switching point is configured to switch playback between the source audio file and the audio clip during playing the source multimedia file. Such mechanism realizes the random splicing of the audio clip with the source audio file. In arrangements of the present disclosure, the intelligent terminal can be a smart mobile terminal, a tablet computer, a laptop computer, a smart handheld device, a personal computer (PC), a computer, a smart screen, various wearable devices, a personal digital assistant (PDA), etc., which is not limited.

Some arrangements of the present disclosure are described in further detail below in conjunction with the accompanying drawings.

Figure 1:
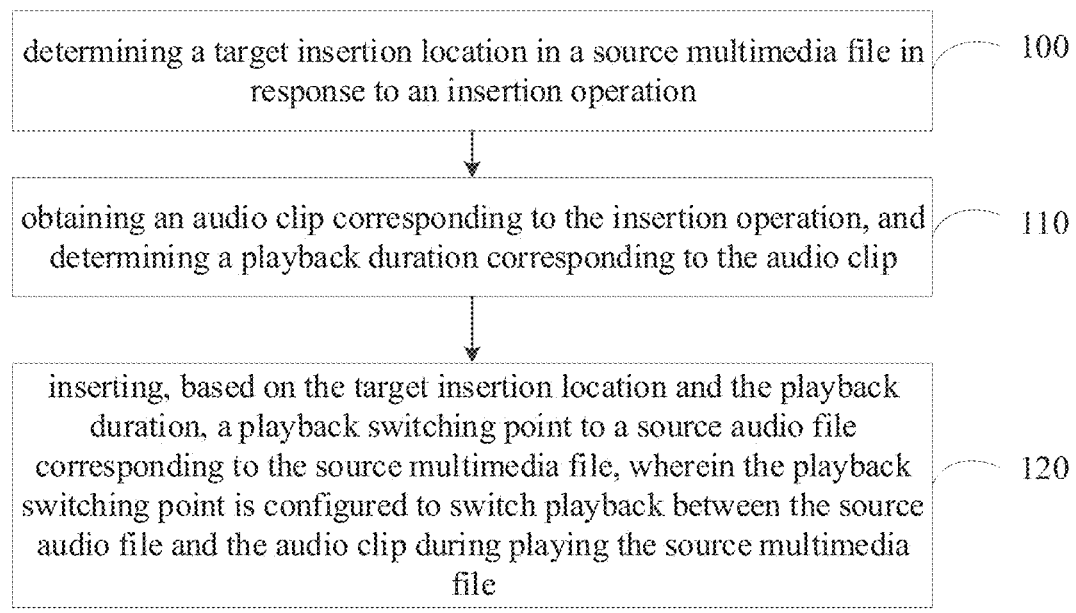
FIG. 1 is a flow diagram illustrating an intelligent terminal splicing an audio file according to some arrangements of the present disclosure.

Referring to FIG. 1, in the arrangements of present disclosure, the specific process of audio file splicing by the intelligent terminal is as follows.

At 100, a target insertion location is determined in a source multimedia file in response to an insertion operation.

In the arrangements of present disclosure, the intelligent terminal presents, on the audio file editing interface, the source multimedia file requiring audio file splicing, and then, in response to the insertion operation, the intelligent terminal determines the insertion time point in the source multimedia file where the audio file needs to be inserted, e.g., the target insertion location.

In some arrangements, the source multimedia file may be a short video, or an audio file.

Figure 2A:
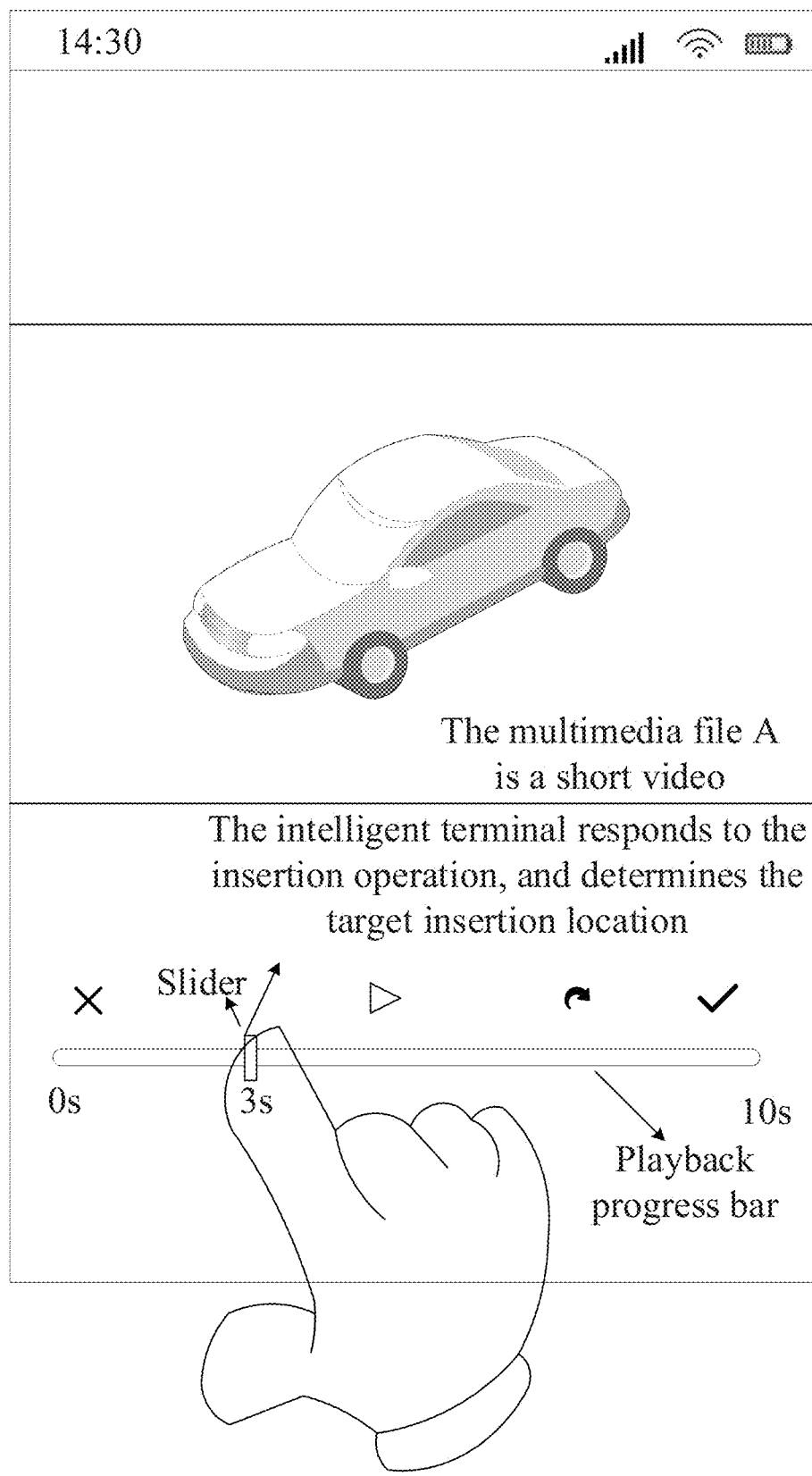
FIG. 2A is a schematic diagram illustrating the first application scenario according to some arrangements of the present disclosure.

For example, as illustrated in FIG. 2A, take the multimedia file A as an example of a short video.

The intelligent terminal presents, based on the total playback duration (e.g., 10 s) of multimedia file A, the playback prompt information (e.g., the playback progress bar and the slider placed on the playback progress bar) of multimedia file A on the audio file editing interface. By sliding the slider on the playback progress bar, the user determines the insertion time point at which the audio file needs to be inserted, thus triggering the insertion operation.

Assuming that the insertion operation is triggered by the user moving the slider to the location of the playback time point 3 s of the multimedia file A.

Then, the intelligent terminal receives the insertion operation and, in response to the insertion operation, determines 3 s as the time point for inserting the audio file, e.g., the target insertion location.

Figure 2B:
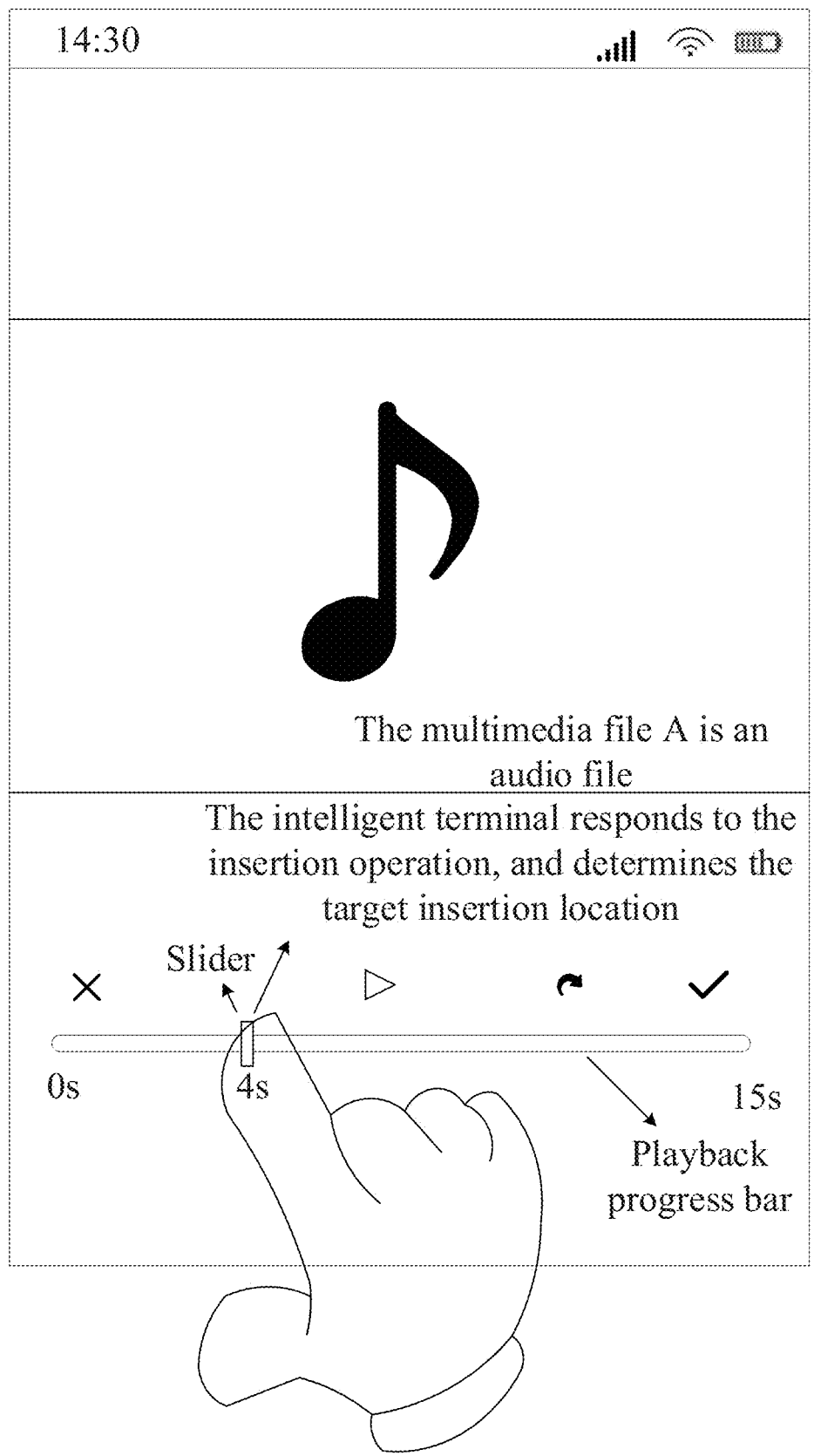
FIG. 2B is a schematic diagram illustrating the second application scenario according to some arrangements of the present disclosure.

In some arrangements, as illustrated in FIG. 2B, take the multimedia file A as an example of an audio file.

The intelligent terminal presents, based on the total playback duration (e.g., 15 s) of multimedia file A, the playback prompt information (e.g., the playback progress bar and the slider placed on the playback progress bar) of multimedia file A on the audio file editing interface.

By sliding the slider on the playback progress bar, the user determines the insertion time point at which the audio file needs to be inserted, thus triggering the insertion operation.

Assuming that the insertion operation is triggered by the user moving the slider to the location of the playback time point 3 s of the multimedia file A.

Then, the intelligent terminal receives the insertion operation and, in response to the insertion operation, determines 3 s as the time point for inserting the audio file, e.g., the target insertion location.

At 110, obtaining an audio clip, and determining a playback duration corresponding to the audio clip.

In arrangements of the present disclosure, there are multiple ways for performing at 110 by the intelligent terminal, including, but not limited to, the following two.

In the first way, the intelligent terminal obtains the audio clip based on local audio data.

In some arrangements of the present disclosure, the intelligent terminal can take the local audio data as the audio clip.

Figure 3:
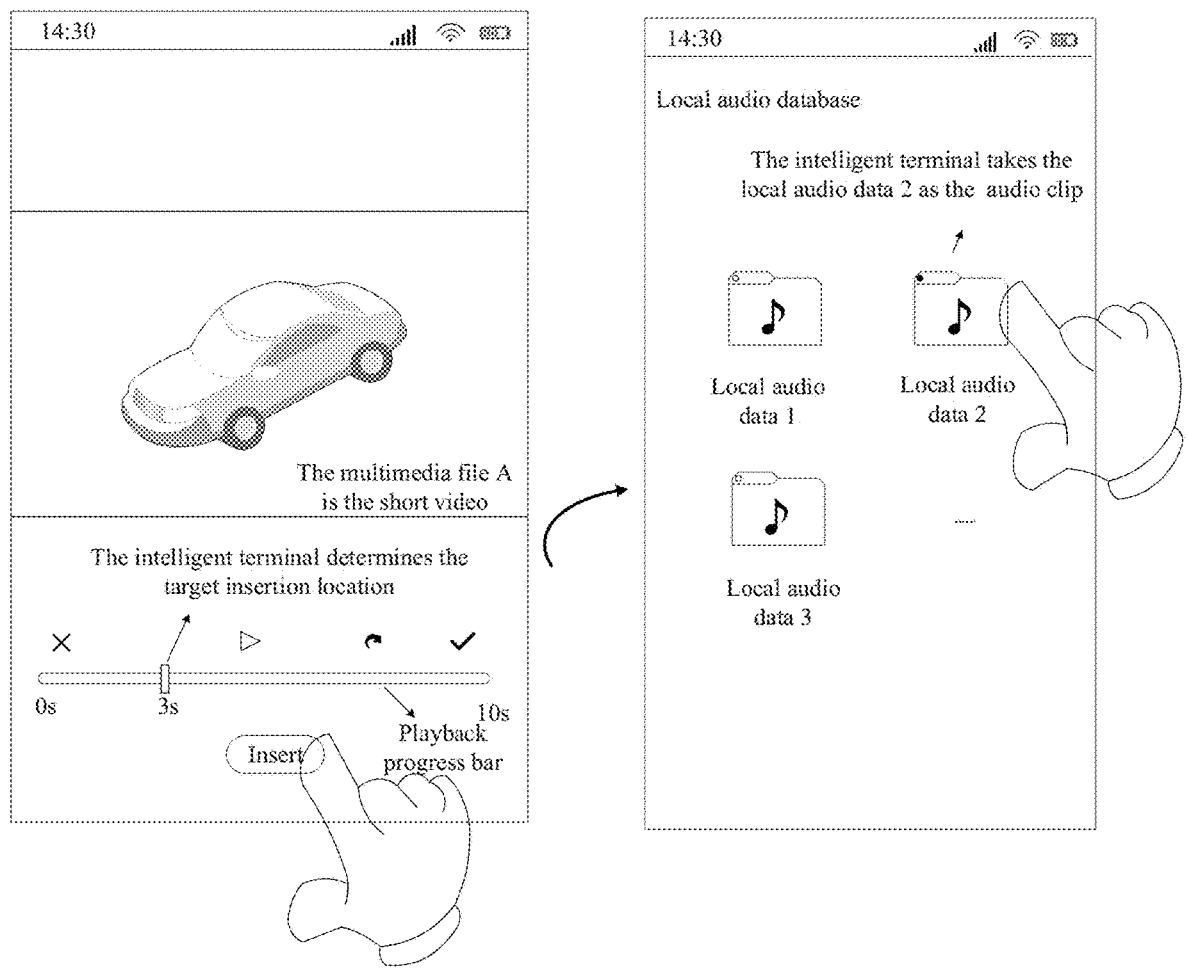
FIG. 3 is a schematic diagram illustrating the intelligent terminal obtaining an audio clip according to some arrangements of the present disclosure.

For example, as illustrated in FIG. 3, the multimedia file A is still taken as an example of a short video.

Assuming that the target insertion location determined by the intelligent terminal is 3 s, and the audio clip obtained is local audio data 2.

Then, in response to the "insert" button clicked by the user, the intelligent terminal goes to the local audio database and selects the local audio data 2 as the audio clip.

In the second way, the intelligent terminal obtains, in response to a recording operation, the recorded audio data as the audio clip.

Figure 4:
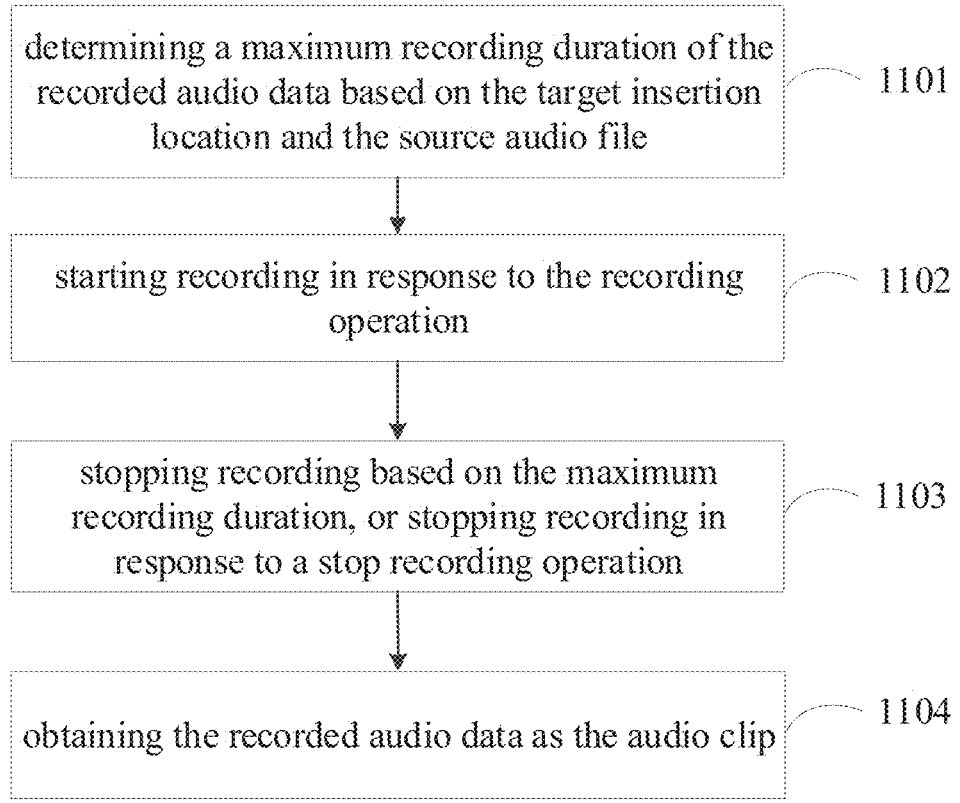
FIG. 4 is a flow diagram illustrating the intelligent terminal obtaining recorded audio data according to some arrangements of the present disclosure.

In the arrangements of present disclosure, the intelligent terminal can record a piece of satisfactory recorded audio data by activating the recording function, and then, use the recorded audio data as the audio clip. Specifically, FIG. 4 illustrates the manner in which an intelligent terminal obtains the audio clip by recording.

At 1101, determining a maximum recording duration of the recorded audio data based on the target insertion location and the source audio file corresponding to the source multimedia file.

In the arrangements of the present disclosure, after the intelligent terminal determines the target insertion location in the source multimedia file, it needs to determine the maximum recording duration of the recorded audio data based on the target insertion location and the source audio file corresponding to the source multimedia file before responding to the recording operation. Specifically, there are following three cases of the intelligent terminal determining the maximum recording duration of the recorded audio data.

In case one, the intelligent terminal determines, in response to the source audio file corresponding to the source multimedia file without spliced files, the duration between the target insertion location and the end moment of the source multimedia file as the maximum recording duration of the recorded audio data.

In a specific implementation, if the audio file is inserted into the source multimedia file for the first time, the intelligent terminal determines, in response to the source audio file corresponding to the source multimedia file without spliced files, the maximum recording duration of the recorded audio data as the duration between the target insertion location and the end moment of the source multimedia file. It should be noted that, in these arrangements of present disclosure, the so-called spliced file refers to the audio clip last inserted into the source audio file corresponding to the source multimedia file.

The meanings characterized by the spliced files mentioned in the arrangements of present disclosure are the same and will not be repeated here.

Figure 5:
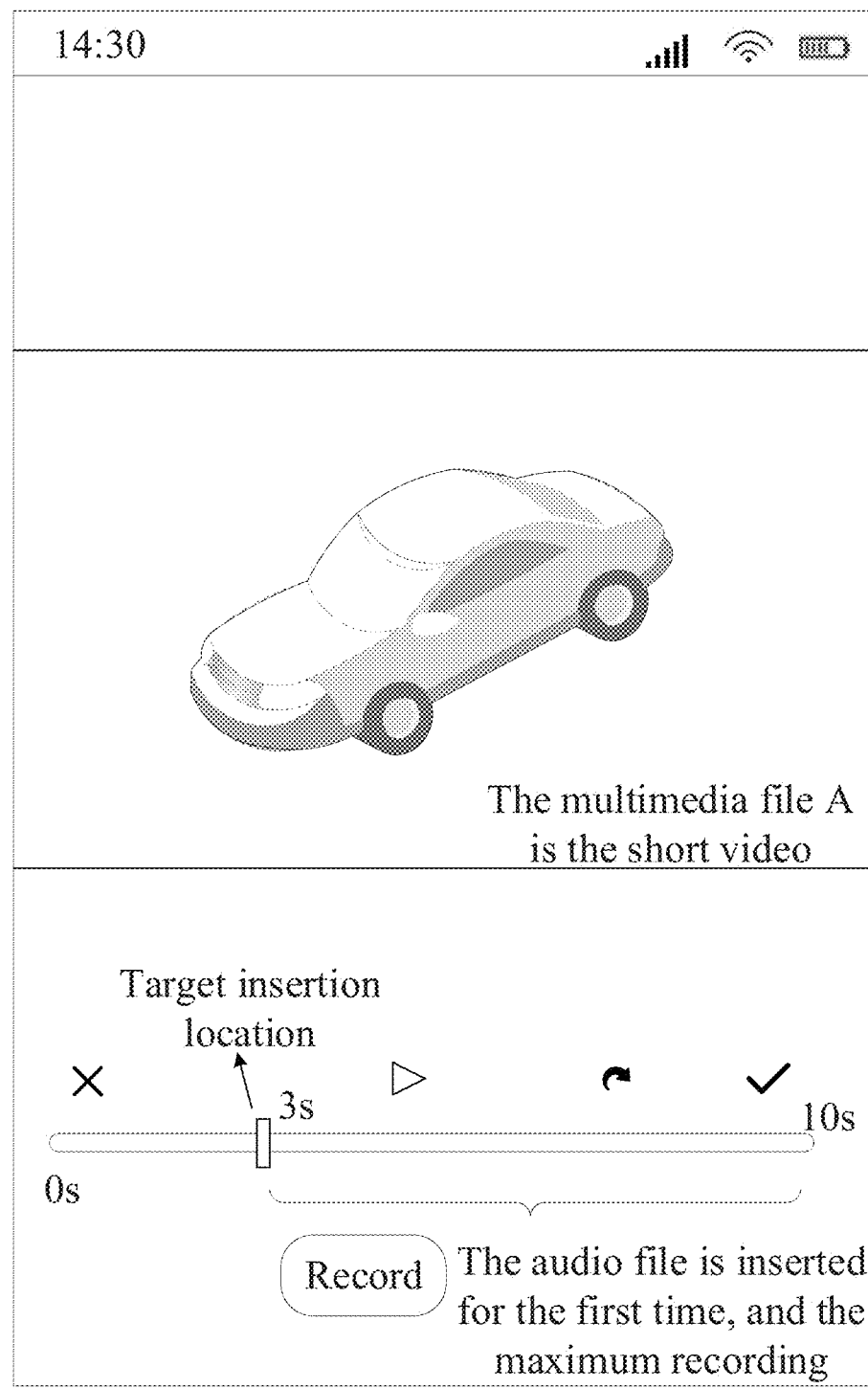
FIG. 5 is a schematic diagram illustrating an application scenario in which the intelligent terminal determines a maximum recording duration according to some arrangements of the present disclosure.

For example, as illustrated in FIG. 5, the multimedia file A is still taken as an example of a short video.

Assuming that the target insertion location is determined by the intelligent terminal as 3 s, the total playback duration of multimedia file A is 10 s (e.g., the end moment is 10 s), and no audio file has been inserted in the multimedia file A.

Then, the intelligent terminal determines, in response to the source audio file corresponding to the multimedia file A without spliced files, the duration between the end moment of the multimedia file A and the target insertion location, e.g., 10−3=7 s, as the maximum duration for recording the audio data, e.g., the maximum recording duration of the recorded audio data is 7 s.

In case two, the intelligent terminal determines, in response to the spliced file in the source audio file corresponding to the source multimedia file being overwritable, the duration between the target insertion location and the end moment of the source multimedia file as the maximum recording duration of the recorded audio data.

In a specific implementation, the intelligent terminal responds to the spliced file in the source audio file corresponding to the source multimedia file being overwritable, then, in the same way as it responds to the source audio file corresponding to the source multimedia file without the spliced files, the maximum recording duration of the recorded audio data is similarly determined by the intelligent terminal as the duration between the target insertion location and the end moment of the source multimedia file.

Figure 6:
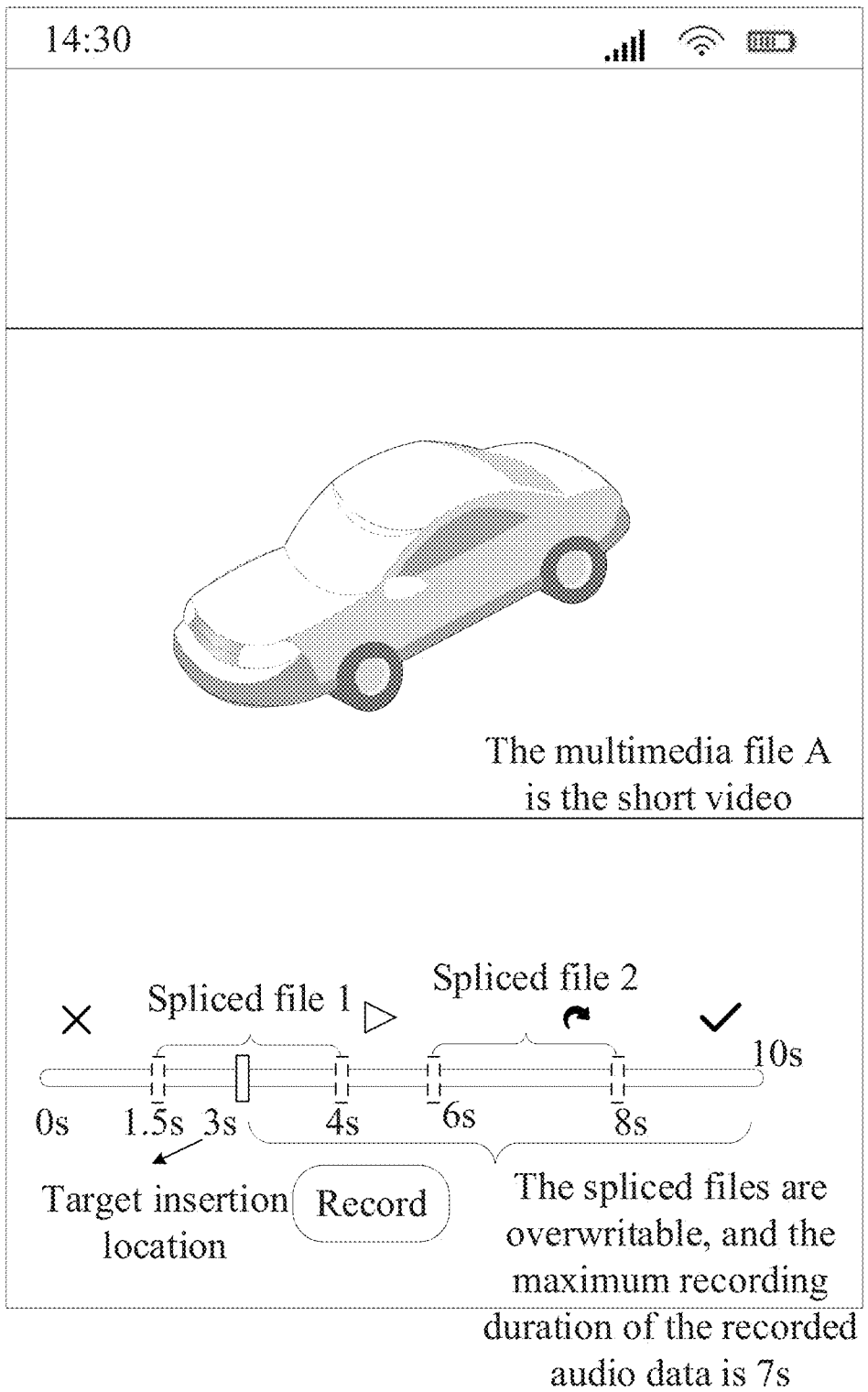
FIG. 6 is a schematic diagram illustrating an application scenario in which the intelligent terminal determines the maximum recording duration according to some arrangements of the present disclosure.

For example, as illustrated in FIG. 6, the multimedia file A is still taken as an example of a short video.

Assuming that the target insertion location is determined by the intelligent terminal as 3 s, the total playback duration of multimedia file A is 10 s (e.g., the end moment is 10 s), and there are two spliced files in the source audio file corresponding to the multimedia file A in the order of spliced file 1 and spliced file 2, and the spliced files are overwritable.

It is also assumed that the start time of spliced file 1 is 1.5 s and the end time of spliced file 1 is 4 s; and the start time of spliced file 2 is 6 s and the end time of spliced file 2 is 8 s.

Then, the intelligent terminal determines, in response to the spliced files in the source audio file corresponding to the source multimedia file being overwritable, the duration between the target insertion location and the end moment of multimedia file A, e.g., 10−3=7 s, as the maximum duration for recording the audio data, e.g., the maximum recording duration of the recorded audio data is 7 s.

In the case three, the intelligent terminal determines, in response to a spliced file in the source audio file corresponding to the source multimedia file being not overwritable, the duration between the target insertion location and a start moment of first one spliced file after the target insertion location as the maximum recording duration of the recorded audio data.

In a specific implementation, the intelligent terminal responds to the spliced file in the source audio file corresponding to the source multimedia file being not overwritable, then, the intelligent terminal needs to determine the start moment and end moment of the spliced file and determine the first one spliced file after the target insertion location based on the target insertion location, and then, the duration between the target insertion location and the start moment of the first spliced file is determined by the intelligent terminal as the maximum recording duration of the recorded audio data.

Figure 7:
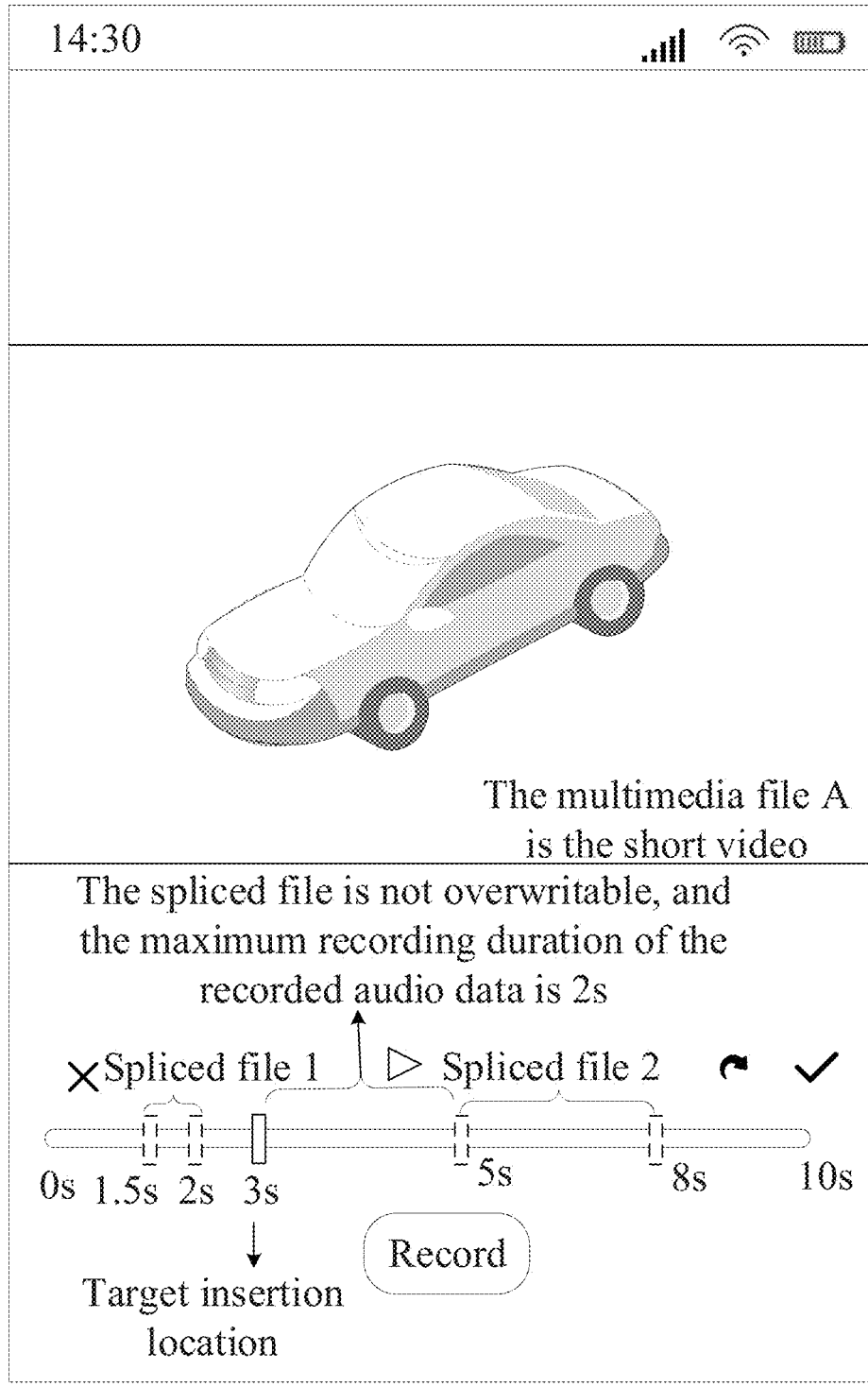
FIG. 7 is a schematic diagram illustrating an application scenario in which the intelligent terminal determines the maximum recording duration according to some arrangements of the present disclosure.

For example, as illustrated in FIG. 7, the multimedia file A is still taken as an example of a short video.

Assuming that the target insertion location is determined by the intelligent terminal as 3 s, the total playback duration of multimedia file A is 10 s (e.g., the end moment is 10 s), and there are two spliced files in the source audio file corresponding to the multimedia file A in the order of spliced file 1 and spliced file 2, and the spliced files are not over-writable.

It is also assumed that the start time of spliced file 1 is 1.5 s and the end time of spliced file 1 is 2 s; and the start time of spliced file 2 is 5 s and the end time of spliced file 2 is 8 s.

Then, the intelligent terminal first determines the start moment and end moment of spliced file 1 and the start moment and end moment of spliced file 2, and then, based on the target insertion location (e.g., 3 s), the first one spliced file after the target insertion location is determined to be the spliced file 2. Thus, the duration between the target insertion location and the start moment of spliced file 2, e.g., 5−3=2 s, is determined by the intelligent terminal as the maximum recording duration of the recorded audio data (e.g., 2 s).

At 1102, starting recording in response to the recording operation.

In a specific implementation, the intelligent terminal starts the recording function in response to the recording operation, and then the audio data starts to be recorded.

At 1103, stopping recording based on the maximum recording duration, or stopping recording in response to a stop recording operation.

In some arrangements of present disclosure, the intelligent terminal stops recording audio data in response to the stop recoding operation in ways that include, but are not limited to, the following two.

In the first way, if the intelligent terminal receives the stop recording operation before the maximum recording duration of the recorded audio data expires, the recording is stopped.

Figure 8:
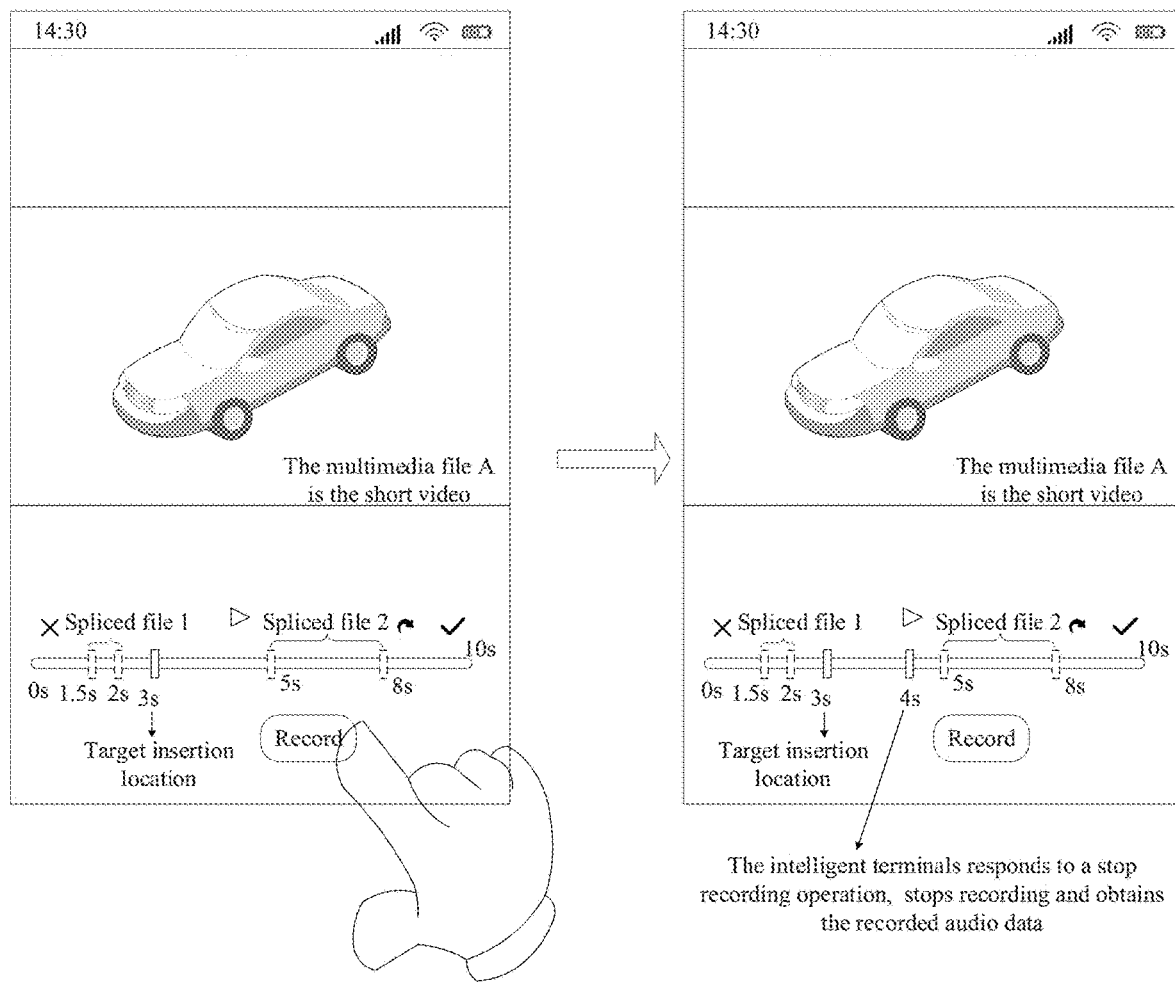
FIG. 8 is a schematic diagram illustrating an application scenario in which the intelligent terminal obtains recorded audio data according to some arrangements of the present disclosure.

For example, as illustrated in FIG. 8, the multimedia file A is still taken as an example of a short video.

It is still assumed that the target insertion location determined by the intelligent terminal is 3 s, the total playback duration of multimedia file A is 10 s (e.g., the end moment of the source is 10 s), and there are two spliced files in the source audio file corresponding to multimedia file A in order of spliced file 1 and spliced file 2, and the spliced files are not over-writable.

Furthermore, it is assumed that the start time of spliced file 1 is 1.5 s and the end time of spliced file 1 is 2 s, and the start time of spliced file 2 is 5 s and the end time of spliced file 2 is 8 s.

Then, the intelligent terminal determines that the first one spliced file after the target insertion location is spliced file 2 based on the respective start and end moments of spliced file 1 and spliced file 2. Thus, the duration between the target insertion location (e.g., 3 s) and the start moment of splice file 2 (e.g., 5 s), e.g., 5−3=2 s, is determined by the intelligent terminal as the maximum recording duration of the recorded audio data (e.g., 2 s).

Furthermore, it is assumed that before the maximum recording duration of the recorded audio data expires, the intelligent terminal receives the stop recording operation, and the trigger moment of the stop recording operation is 4 s.

Then, the intelligent terminal stops recording in response to the stop recording operation, so as to obtain the corresponding recorded audio data.

In the second way, if the intelligent terminal does not receive the stop recording operation before the maximum recording duration of the recorded audio data expires, recording will stop until the duration for recording the audio data reaches the maximum recording duration.

Figure 9:
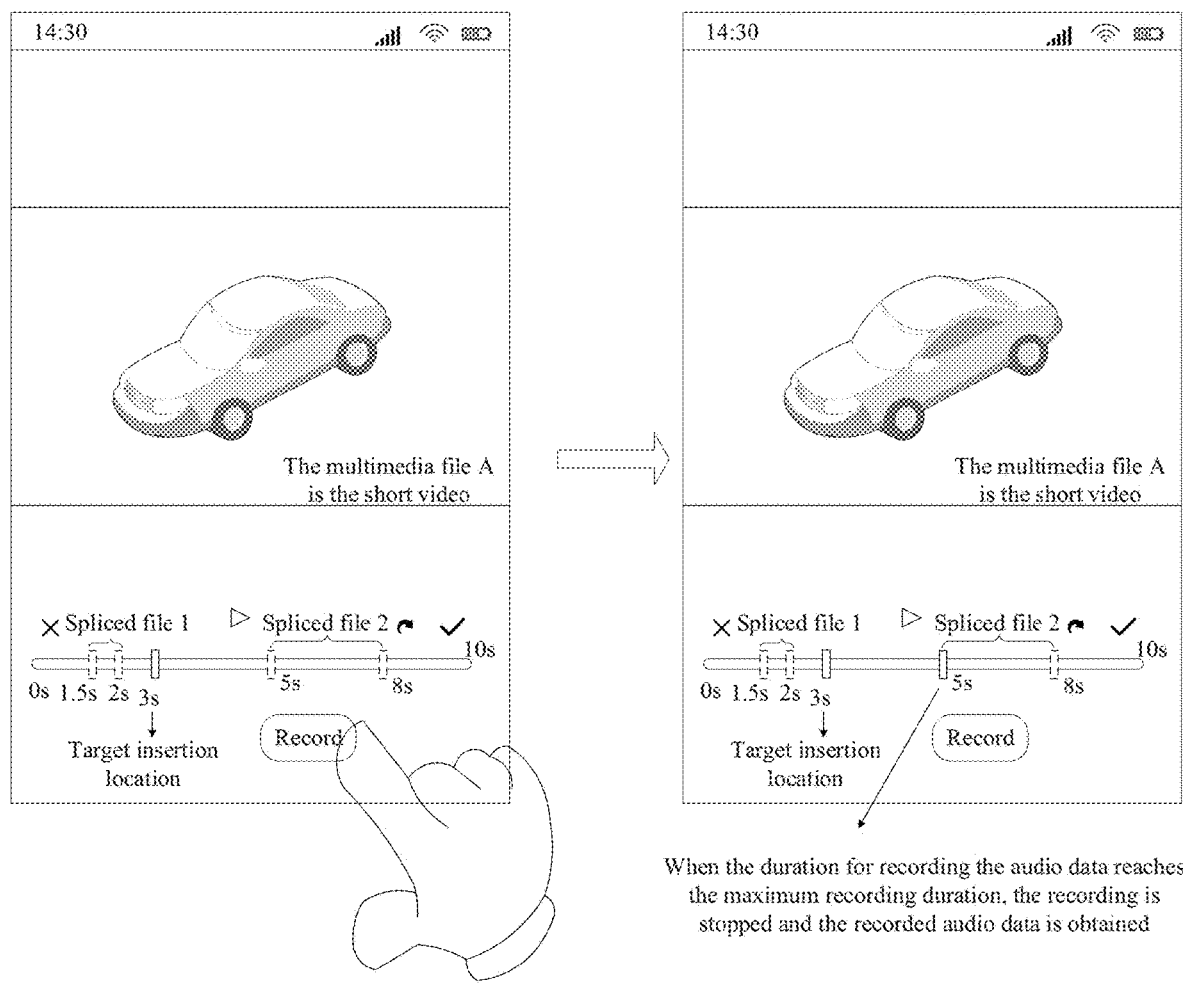
FIG. 9 is a schematic diagram illustrating an application scenario in which the intelligent terminal obtains recorded audio data according to some arrangements of the present disclosure.

For example, as illustrated in FIG. 9, the multimedia file A is still taken as an example of a short video.

It is still assumed that the target insertion location determined by the intelligent terminal is 3 s, the total playback duration of multimedia file A is 10 s (e.g., the end moment of the source is 10 s), and there are two spliced files in the source audio file corresponding to multimedia file A in order of spliced file 1 and spliced file 2, and the spliced files are not over-writable.

Furthermore, it is assumed that the start time of spliced file 1 is 1.5 s and the end time of spliced file 1 is 2 s, and the start time of spliced file 2 is 5 s and the end time of spliced file 2 is 8 s.

Then, the intelligent terminal determines that the first one spliced file after the target insertion location is spliced file 2 based on the respective start and end moments of spliced file 1 and spliced file 2. Thus, the duration between the target insertion location (e.g., 3 s) and the start moment of splice file 2 (e.g., 5 s), e.g., 5−3=2 s, is determined by the intelligent terminal as the maximum recording duration of the recorded audio data (e.g., 2 s).

Furthermore, it is assumed that the intelligent terminal does not receive the stop recording operation before the maximum recording duration of the recorded audio data expires.

Then, when the duration for recording the audio data reaches the maximum recording duration, the intelligent terminal stops recording and thus obtains the recorded audio data.

At 1104, obtaining the recorded audio data as the audio clip.

In the arrangements of the present disclosure, after performing at 1103, the intelligent terminal obtains the recorded audio data, and then takes the recorded audio data as the audio clip. In this case, the start moment of the audio clip is the target insertion location, and the playback duration corresponding to the audio clip is the recording duration of the recorded audio data.

Figure 10:
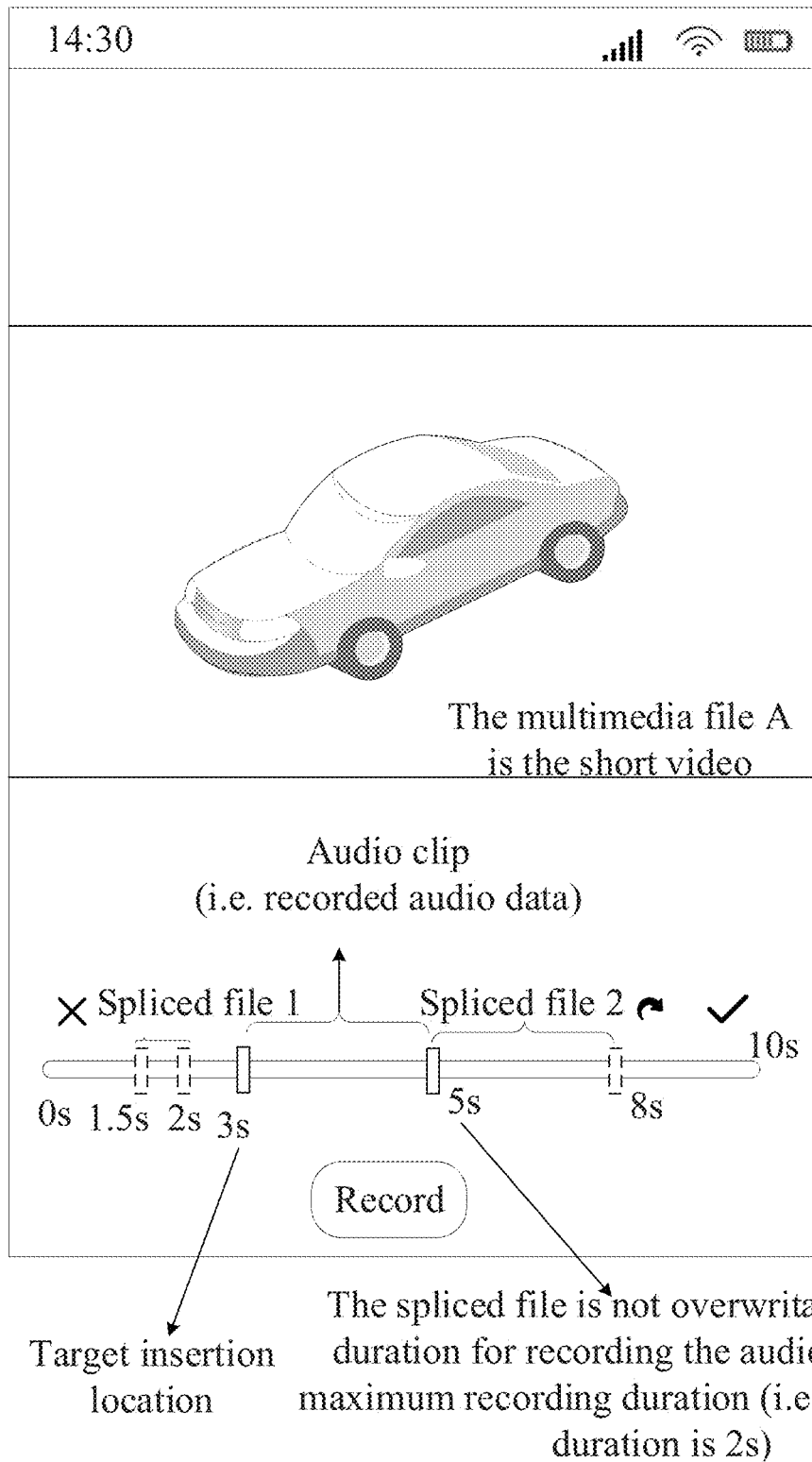
FIG. 10 is a schematic diagram illustrating the intelligent terminal obtaining the audio clip according to some arrangements of the present disclosure.

For example, as illustrated in FIG. 10, the multimedia file A is still taken as an example of a short video.

It is still assumed that the target insertion location determined by the intelligent terminal is 3 s, the total playback duration of multimedia file A is 10 s (e.g., the end moment of the source is 10 s), and there are two spliced files in the source audio file corresponding to multimedia file A in order of spliced file 1 and spliced file 2, and the spliced files are not over-writable.

Furthermore, it is assumed that the start time of spliced file 1 is 1.5 s and the end time of spliced file 1 is 2 s, and the start time of spliced file 2 is 5 s and the end time of spliced file 2 is 8 s; and the recording duration of the recorded audio data obtained by the intelligent terminal is the maximum recording duration.

Then, the intelligent terminal will obtain the recorded audio data as the audio clip, e.g., the starting moment of the audio clip is 3 s and the corresponding playback duration is 5−3=2 s.

At 120, inserting, based on the target insertion location and the playback duration, a playback switching point to a source audio file corresponding to the source multimedia file, where the playback switching point is configured to switch playback between the source audio file and the audio clip during playing the source multimedia file.

In the arrangements of the present disclosure, the intelligent terminal obtains the audio clip after performing at 110, and before performing at 120, the intelligent terminal needs to determine whether there is a spliced file in the source audio file corresponding to the source multimedia file by detection, and the corresponding detection result contains, but is not limited to, the following two scenarios.

In scenario one, if the intelligent terminal determines that there is a spliced file in the source audio file corresponding to the source multimedia file through detection, it also needs to detect whether there is a spliced file in the source audio file corresponding to the target insertion location, which includes, but not limited to, the following two cases.

Case I: if the intelligent terminal determines that there is a spliced file in the source audio file corresponding to the target insertion location and the spliced file is not overwritable, the intelligent terminal disables the insertion operation in response to the source audio file corresponding to the target insertion location being the spliced file. Here, the disabling insertion operation refers to the insertion operation being invalidated by the intelligent terminal, e.g., the intelligent terminal will not crop the source audio file corresponding to the source multimedia file.

Figure 11:
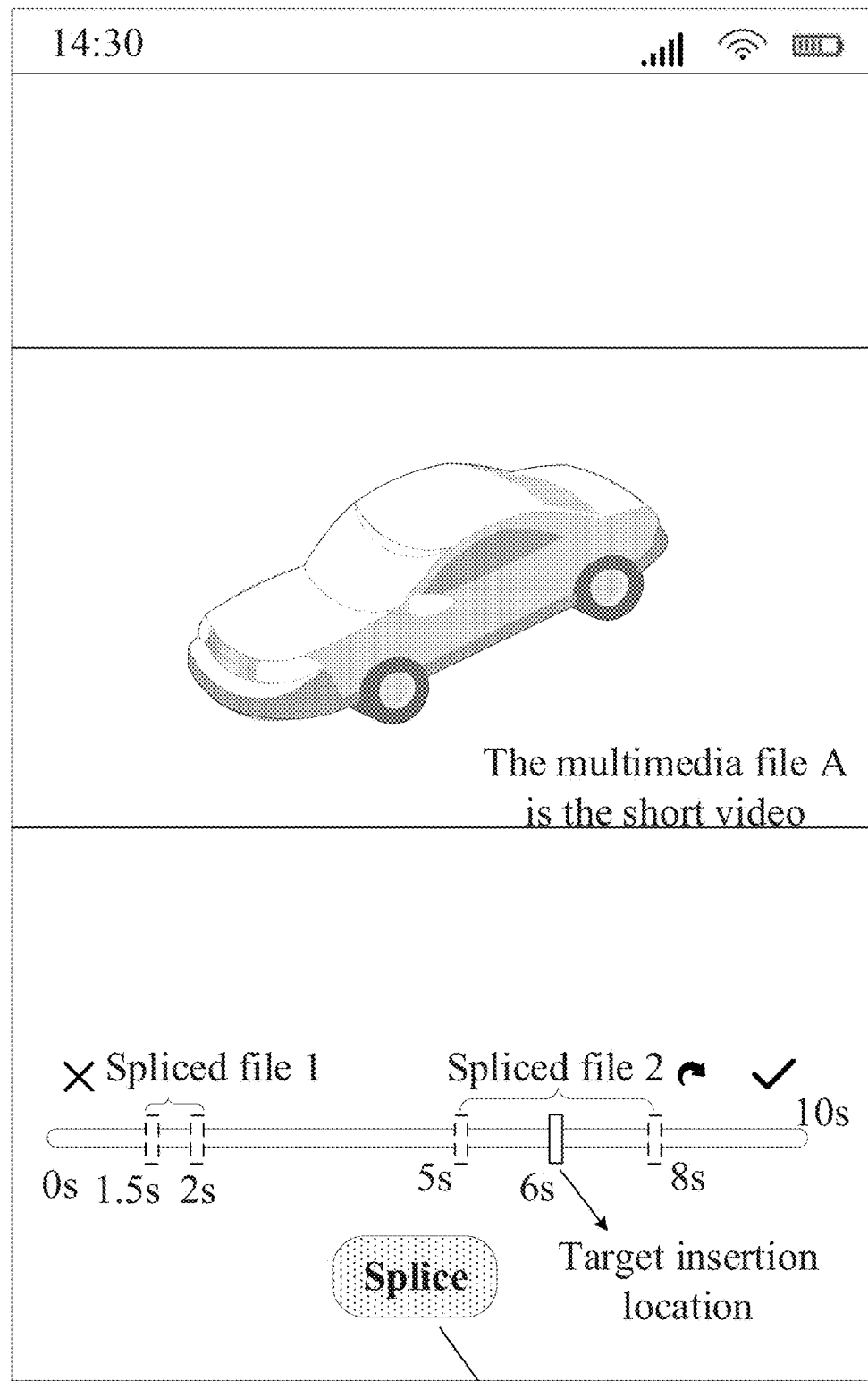
FIG. 11 is a schematic diagram illustrating the third application scenario according to some arrangements of the present disclosure.

For example, as illustrated in FIG. 11, the multimedia file A is still taken as an example of a short video.

It is assumed that the target insertion location determined by the intelligent terminal is 6 s, the total playback duration of multimedia file A is 10 s (e.g., the end moment of the source is 10 s), and there are two spliced files in the source audio file corresponding to multimedia file A in order of spliced file 1 and spliced file 2, and the spliced files are not overwritable.

Furthermore, it is assumed that the start time of spliced file 1 is 1.5 s and the end time of spliced file 1 is 2 s, and the start time of spliced file 2 is 5 s and the end time of spliced file 2 is 8 s.

Then, based on the target insertion location (e.g., 6 s), the intelligent terminal determines that the source audio file corresponding to the target insertion location is spliced file 2, then the "splice" button is grayed out and the insertion operation is invalidated.

Case II: if the intelligent terminal determines that there is a spliced file in the source audio file corresponding to the target insertion location and the spliced file is over-writable, or if the intelligent terminal determines that there is no spliced file, the intelligent terminal inserts, based on the target insertion location and the playback duration, playback switching points to the source audio file corresponding to the source multimedia file, e.g., obtains the spliced and latest source audio file, and then the following operations are performed.

Operation I: the intelligent terminal switches, at a first playback switching point, from playing the source audio file corresponding to the source multimedia file to playing the audio clip based on the target insertion location.

Operation II: the intelligent terminal switches, at a second playback switching point, from playing the audio clip to playing the source audio file corresponding to the source multimedia file based on the audio clip having played for the playback duration.

Figure 12:
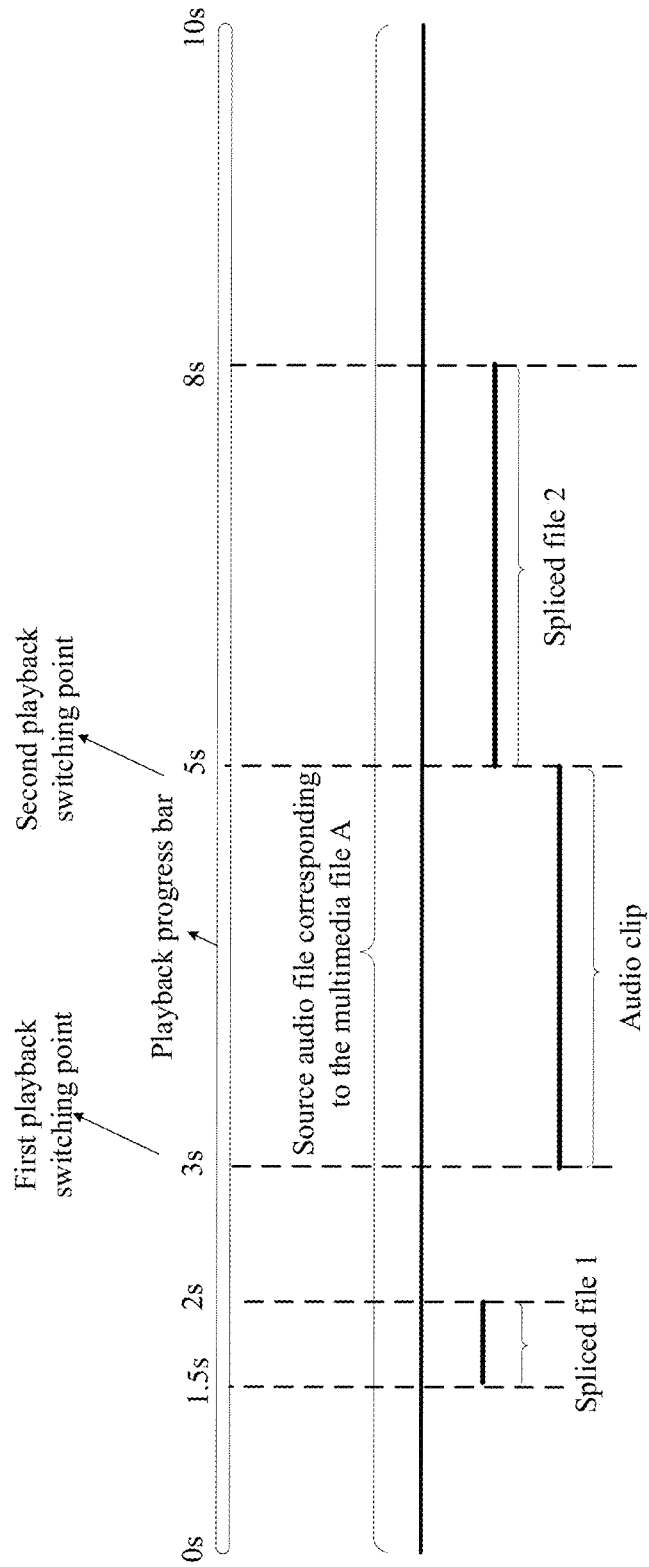
FIG. 12 is a schematic diagram illustrating the intelligent terminal obtaining a spliced and latest source audio file according to some arrangements of the present disclosure.

For example, as illustrated in FIG. 12, the multimedia file A is still taken as an example of a short video.

It is assumed that the target insertion location determined by the intelligent terminal is 3 s, the total duration of the source playback of multimedia file A is 10 s (e.g., the end moment is 10 s), and there are two spliced files in the source audio file corresponding to multimedia file A in order of spliced file 1 and spliced file 2, and the spliced files are not over-writable.

Furthermore, it is assumed that the start time of spliced file 1 is 1.5 s and the end time of spliced file 1 is 2 s, and the start time of spliced file 2 is 5 s and the end time of spliced file 2 is 8 s; and the playback duration of the obtained audio clip (e.g., recorded audio data) is 2 s.

Then, the intelligent terminal switches, at the first playback switching point (e.g., 3 s), from playing the source audio file corresponding to the multimedia file A to playing the audio clip based on the target insertion location; and the intelligent terminal switches, at the second playback switching point (e.g., 5 s), from playing the audio clip to playing the source audio file corresponding to the multimedia file A based on the audio clip having played for the playback duration.

Figure 13:
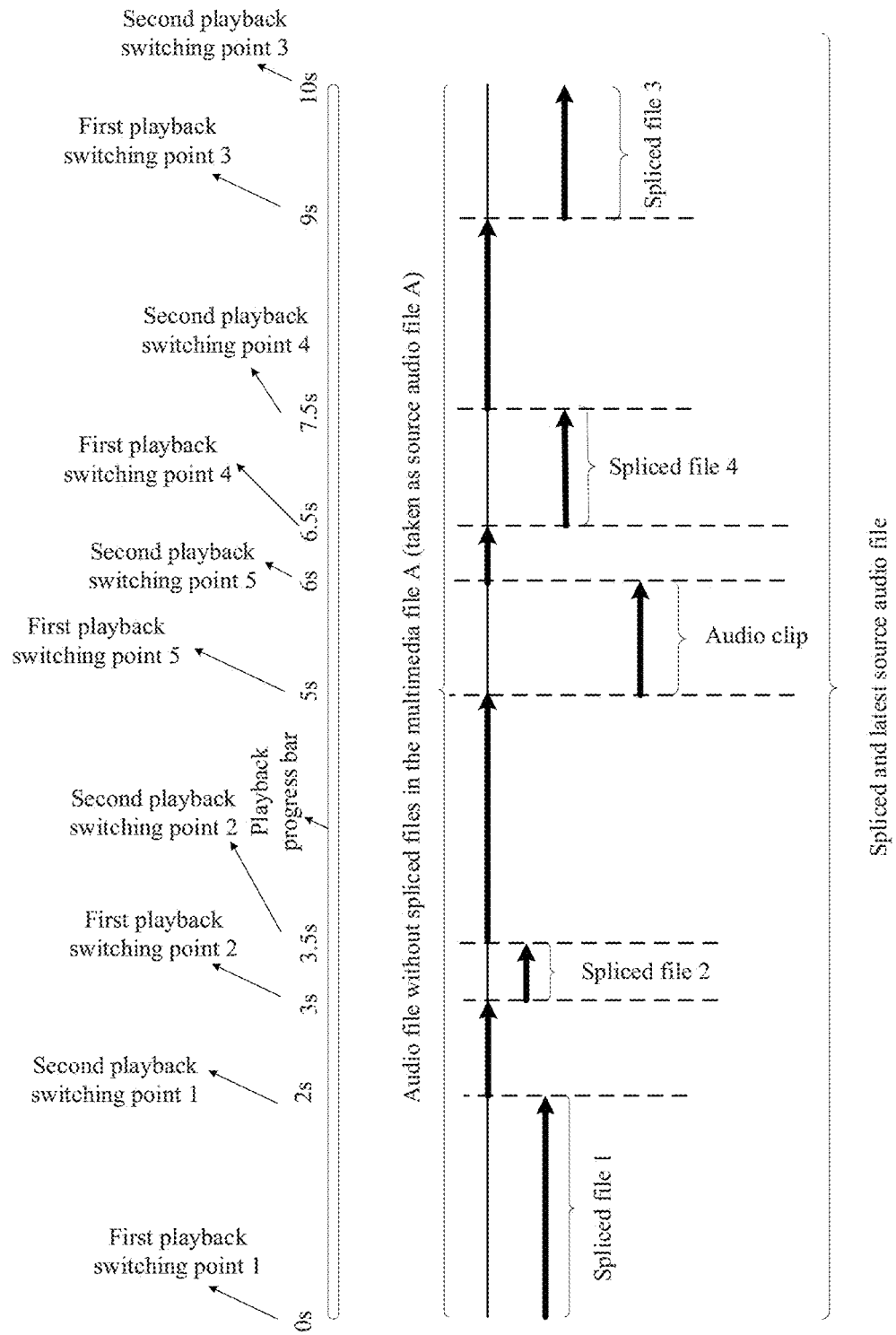
FIG. 13 is a schematic diagram illustrating an application scenario of jumping in the process of playing the spliced and latest source audio file on the intelligent terminal according to some arrangements of the present disclosure.

In some arrangements, as illustrated in FIG. 13, the multimedia file A is still taken as an example of a short video.

It is still assumed that the total playback duration of multimedia file A is 10 s (e.g., the end moment is 10 s), the spliced files are not over-writable, and the audio file of the multimedia file A without the spliced file is taken as the source audio file A.

It is also assumed that the source audio file corresponding to the multimedia file A contains four spliced files, which are noted as spliced file 1, spliced file 2, spliced file 3, and spliced file 4. The start time of spliced file 1 is 0 s and the end time of spliced file 1 is 2 s. The start time of spliced file 2 is 3 s and the end time of spliced file 2 is 3.5 s. The start time of spliced file 3 is 9 s and the end time of spliced file 3 is 10 s. The start time of spliced file 4 is 6.5 s and the end time of spliced file 4 is 7.5 s.

Furthermore, it is assumed that in the source audio file corresponding to multimedia file A, the switching point for switching from the source audio file A to the spliced file is referred to as the first playback switching point, and the switching point for switching from the spliced file to source audio file A is referred to as the second playback switching point. The first playback switching points and the second playback switching points already existed in the source audio file corresponding to multimedia file A are described in sequence as follows.

For the spliced file 1, the first playback switching point 1 is 0 s, and the second playback switching point 1 is 2 s.

For the spliced file 2, the first playback switching point 2 is 3 s, and the second playback switching point 2 is 3.5 s.

For the spliced file 3, the first playback switching point 3 is 9 s, and the second playback switching point 3 is 10 s.

For the spliced file 4, the first playback switching point 4 is 6.5 s, and the second playback switching point 4 is 7.5 s.

Furthermore, it is assumed that the target insertion location determined by the intelligent terminal is 5 s, and the playback duration of the audio clip is 1 s.

That is, the first playback switching point of the audio clip is 5 s, and the second playback switching point is 6 s. Then, during playing the spliced and latest source audio file, the intelligent terminal will play spliced file 1 upon reaching the first playback switching point 1 (e.g. 0 s), and upon reaching the second playback switching point 2 (e.g. 2 s), go to source audio file A and start playing the source audio file A.

Upon playing to the first playback switching point 2 (e.g. 3 s), the intelligent terminal goes from source audio file A to spliced file 2 and starts playing the spliced file 2, and upon playing to the second playback switching point 2 (e.g. 3.5 s), it goes from the spliced file 2 to the source audio file A and starts playing the source audio file A.

Upon playing to the first playback switching point 5 (e.g. 5 s), the intelligent terminal goes from source audio file A to the audio clip and starts playing the audio clip, and upon playing to the second playback switching point 5 (e.g. 6 s), it goes from the audio clip to the source audio file A and starts playing the source audio file A.

Upon playing to the first playback switching point 4 (e.g. 6.5 s), the intelligent terminal goes from source audio file A to the spliced file 4 and starts playing the spliced file 4, and upon playing to the second playback switching point 4 (e.g. 7.5 s), it goes from the spliced file 4 to the source audio file A and starts playing the source audio file A.

Upon playing to the first playback switching point 3 (e.g. 9 s), the intelligent terminal goes from source audio file A to the spliced file 3 and starts playing the spliced file 3, and stop playing when it reaches the second playback switching point 3 (e.g. 10 s).

Figure 14:
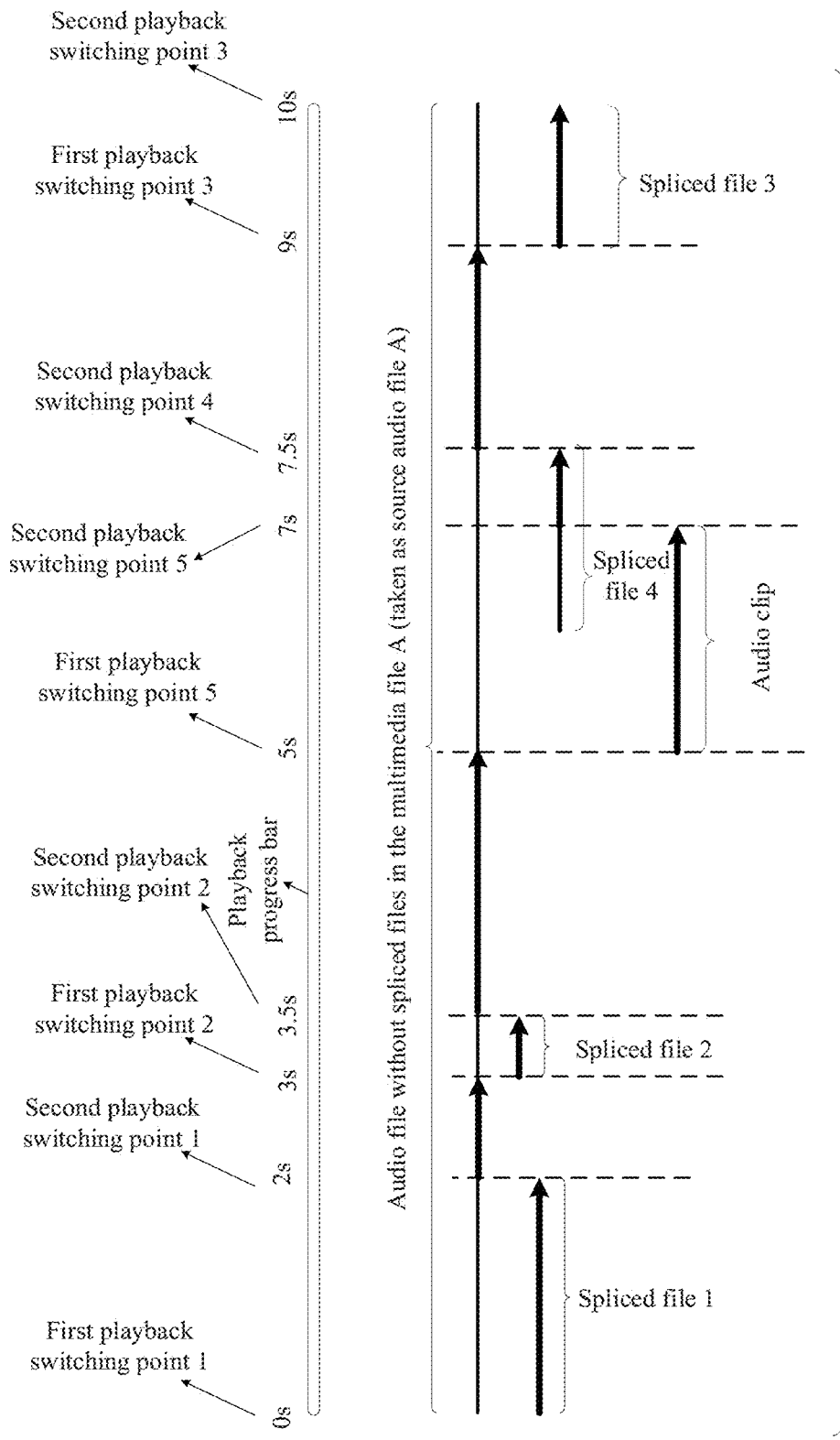
FIG. 14 is a schematic diagram illustrating an application scenario of jumping in the process of playing the spliced and latest source audio file on the intelligent terminal according to some arrangements of the present disclosure.

In some arrangements, as illustrated in FIG. 14, the multimedia file A is still taken as an example of a short video.

It is assumed that the total playback duration of multimedia file A is 10 s (e.g., the source end moment is 10 s), the spliced file is over-writable, and the audio file of the multimedia file A without the spliced file is taken as the source audio file A.

It is also assumed that the source audio file corresponding to the multimedia file A contains four spliced files, which are noted as spliced file 1, spliced file 2, spliced file 3, and spliced file 4. The switching point for switching from the source audio file A to the spliced file is referred to as the first playback switching point, and the switching point for switching from the spliced file to source audio file A is referred to as the second playback switching point. The first playback switching points and the second playback switching points already existed in the source audio file corresponding to multimedia file A are described in sequence as follows.

For the spliced file 1, the first playback switching point 1 is 0 s, and the second playback switching point 1 is 2 s.

For the spliced file 2, the first playback switching point 2 is 3 s, and the second playback switching point 2 is 3.5 s.

For the spliced file 3, the first playback switching point 3 is 9 s, and the second playback switching point 3 is 10 s.

For the spliced file 4, the first playback switching point 4 is 6 s (not shown), and the second playback switching point 4 is 7.5 s.

Furthermore, it is assumed that the target insertion location determined by the intelligent terminal is 5 s, the playback duration of the audio clip is 2 s, and the playback duration of the audio clip overwrites the first half of the audio file of the spliced file 4.

That is, the first playback switching point of the audio clip is 5 s, and the second playback switching point is 7 s. Then, during playing the spliced and latest source audio file, the intelligent terminal will play spliced file 1 upon reaching the first playback switching point 1 (e.g. 0 s), and upon reaching the second playback switching point 2 (e.g. 2 s), go to source audio file A and start playing the source audio file A.

Upon playing to the first playback switching point 2 (e.g. 3 s), the intelligent terminal goes from source audio file A to spliced file 2 and starts playing the spliced file 2, and upon playing to the second playback switching point 2 (e.g. 3.5 s), it goes from the spliced file 2 to the source audio file A and starts playing the source audio file A.

Upon playing to the first playback switching point 5 (e.g. 5 s), the intelligent terminal goes from source audio file A to the audio clip and starts playing the audio clip; upon playing to the second playback switching point 5 (e.g. 7 s), it goes from the audio clip to the spliced file 4 and starts playing the spliced file 4; and upon playing to the second playback switching point 4 (e.g., 7.5 s), it goes from the spliced file 4 to the source audio file A and starts playing the source audio file A.

Upon playing to the first playback switching point 3 (e.g. 9 s), the intelligent terminal goes from source audio file A to the spliced file 3 and starts playing the spliced file 3, and stop playing when it reaches the second playback switching point 3 (e.g. 10 s).

Figure 15:
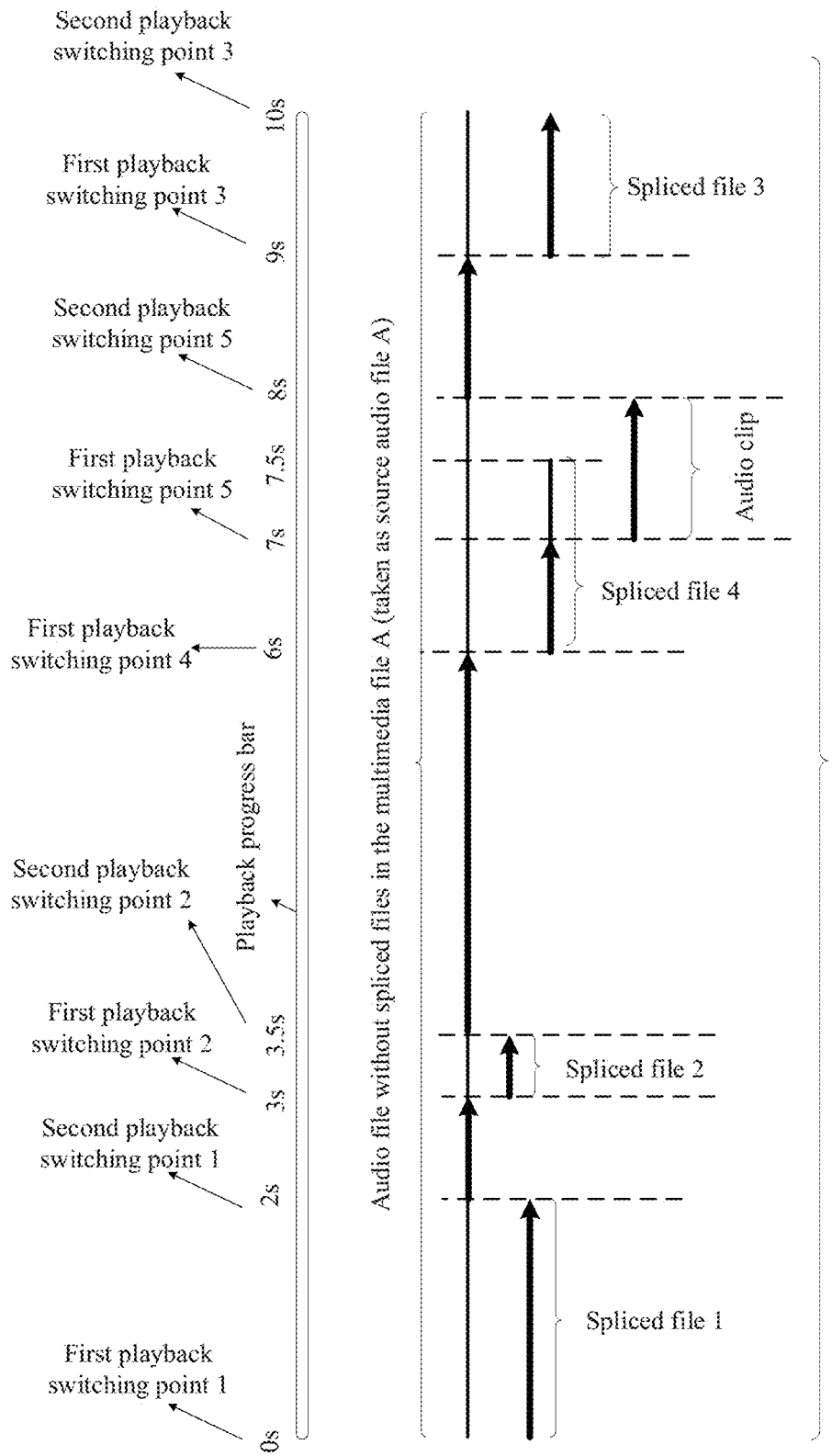
FIG. 15 is a schematic diagram illustrating an application scenario of jumping in the process of playing the spliced and latest source audio file on the intelligent terminal according to some arrangements of the present disclosure.

In some arrangements, as illustrated in FIG. 15, the multimedia file A is still taken as an example of a short video.

It is still assumed that the total playback duration of multimedia file A is 10 s (e.g., the end moment is 10 s), the spliced file is overwritable, and the audio file of the multimedia file A without the spliced file is taken as the source audio file A.

It is also assumed that source audio file corresponding to the multimedia file A contains four spliced files, which are noted as spliced file 1, spliced file 2, spliced file 3, and spliced file 4. The switching point for switching from the source audio file A to the spliced file is referred to as the first playback switching point, and the switching point for switching from the spliced file to source audio file A is referred to as the second playback switching point. The first playback switching points and the second playback switching points already existed in the source audio file corresponding to multimedia file A are described in sequence as follows.

For the spliced file 1, the first playback switching point 1 is 0 s, and the second playback switching point 1 is 2 s.

For the spliced file 2, the first playback switching point 2 is 3 s, and the second playback switching point 2 is 3.5 s.

For the spliced file 3, the first playback switching point 3 is 9 s, and the second playback switching point 3 is 10 s.

For the spliced file 4, the first playback switching point 4 is 6 s, and the second playback switching point 4 is 7.5 s (not shown).

Furthermore, it is assumed that the target insertion location determined by the intelligent terminal is 7 s, the playback duration of the audio clip is 1 s, and the playback duration of the audio clip overwrites the second half of the audio file of the spliced file 4.

That is, the first playback switching point of the audio clip is 7 s, and the second playback switching point is 8 s. Then, the intelligent terminal, during playing the spliced and latest source audio file, plays the spliced file 1 upon reaching the first playback switching point 1 (e.g., 0 s), and goes to the source audio file A and starts playing the source audio file A upon reaching the second playback switching point 2 (e.g., 2 s).

Upon playing to the first playback switching point 2 (e.g. 3 s), the intelligent terminal goes from source audio file A to spliced file 2 and starts playing the spliced file 2, and upon playing to the second playback switching point 2 (e.g. 3.5 s), it goes from the spliced file 2 to the source audio file A and starts playing the source audio file A.

Upon playing to the first playback switching point 4 (e.g. 6 s), the intelligent terminal goes from source audio file A to the spliced file 4 and starts playing the spliced file 4.

Upon playing to the first playback switching point 5 (e.g. 7 s), the intelligent terminal goes from the spliced file 4 to the audio clip and starts playing the audio clip, and upon playing to the second playback switching point 5 (e.g. 8 s), it goes from the audio clip to the source audio file A and starts playing the source audio file A.

Upon playing to the first playback switching point 3 (e.g. 9 s), the intelligent terminal goes from source audio file A to the spliced file 3 and starts playing the spliced file 3, and stop playing when it reaches the second playback switching point 3 (e.g. 10 s).

Figure 16:
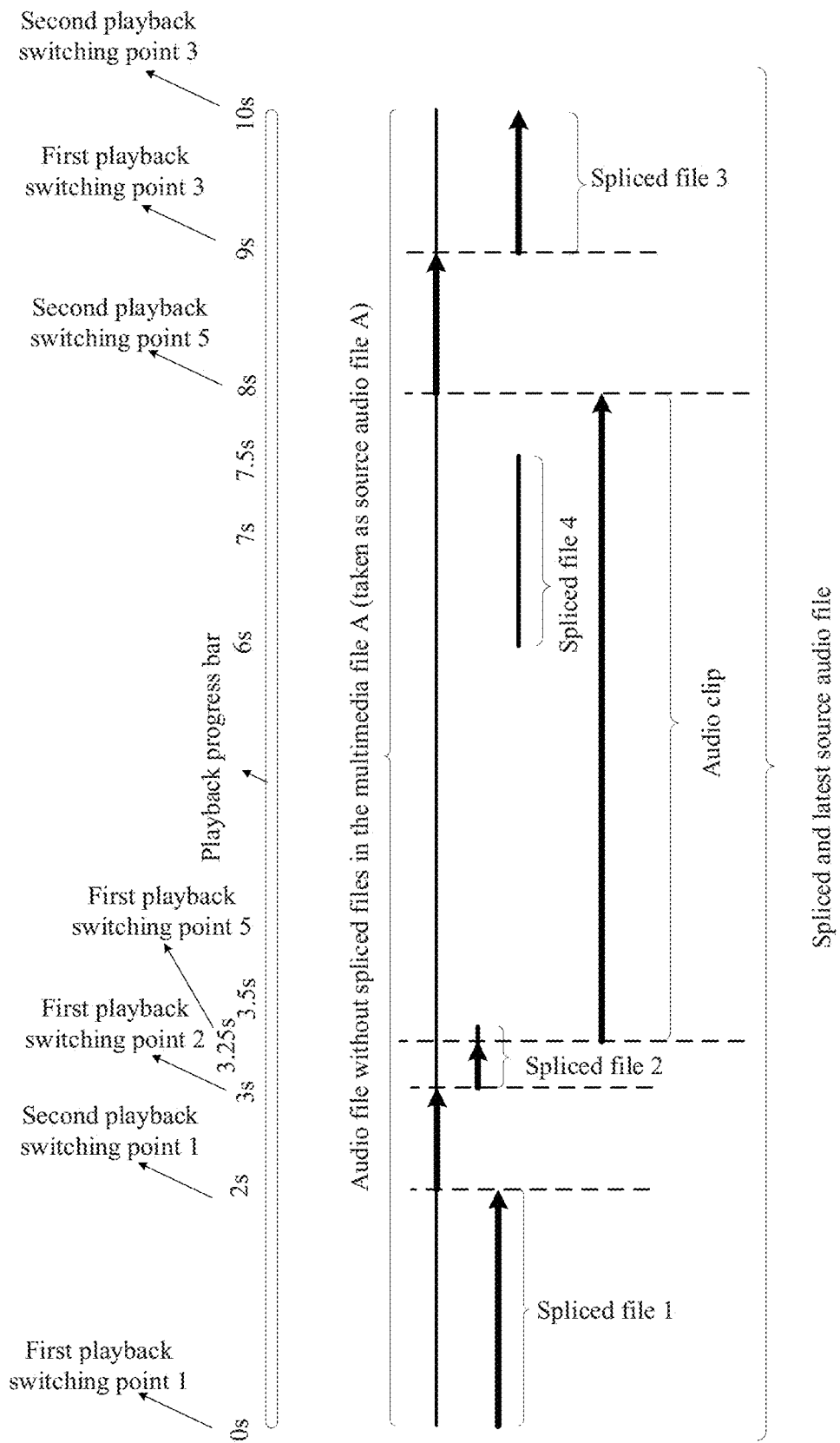
FIG. 16 is a schematic diagram illustrating an application scenario of jumping in the process of playing the spliced and latest source audio file on the intelligent terminal according to some arrangements of the present disclosure.

In some arrangements, as illustrated in FIG. 16, the multimedia file A is still taken as an example of a short video.

It is still assumed that the total playback duration of multimedia file A is 10 s (e.g., the end moment is 10 s), the spliced file is over-writable, and the audio file of the multimedia file A without the spliced file is taken as the source audio file A.

It is also assumed that the source audio file corresponding to the multimedia file A contains four spliced files, which are noted as spliced file 1, spliced file 2, spliced file 3, and spliced file 4. The switching point for switching from the source audio file A to the spliced file is referred to as the first playback switching point, and the switching point for switching from the spliced file to source audio file A is referred to as the second playback switching point. The first playback switching points and the second playback switching points already existed in the source audio file corresponding to multimedia file A are described in sequence as follows.

For the spliced file 1, the first playback switching point 1 is 0 s, and the second playback switching point 1 is 2 s.

For the spliced file 2, the first playback switching point 2 is 3 s, and the second playback switching point 2 is 3.5 s (not shown).

For the spliced file 3, the first playback switching point 3 is 9 s, and the second playback switching point 3 is 10 s.

For the spliced file 4, the first playback switching point 4 is 6 s (not shown), and the second playback switching point 4 is 7.5 s (not shown).

Furthermore, it is assumed that the target insertion location determined by the intelligent terminal is 3.25 s, the playback duration of the audio clip is 4.75 s, and the playback duration of the audio clip overwrites the first half of the audio file of the spliced file 2 and overwrites the spliced file 4.

That is, the first playback switching point of the audio clip is 3.25 s, and the second playback switching point is 8 s. Then, the intelligent terminal, during playing the spliced and latest source audio file, plays the spliced file 1 upon reaching the first playback switching point 1 (e.g., 0 s), and goes to the source audio file A and starts playing the source audio file A upon reaching the second playback switching point 2 (e.g., 2 s).

Upon playing to the first playback switching point 2 (e.g. 3 s), the intelligent terminal goes from source audio file A to spliced file 2 and starts playing the spliced file 2.

Upon playing to the first playback switching point 5 (e.g. 3.25 s), the intelligent terminal goes from the spliced file 2 to the audio clip and starts playing the audio clip, and upon playing to the second playback switching point 5 (e.g. 8 s), it goes from the audio clip to the source audio file A and starts playing the source audio file A.

Upon playing to the first playback switching point 3 (e.g. 9 s), the intelligent terminal goes from source audio file A to the spliced file 3 and starts playing the spliced file 3, and stop playing when it reaches the second playback switching point 3 (e.g. 10 s).

In the arrangements of the present disclosure, the intelligent terminal responds to the insertion operation and determines the target insertion location; then obtains the audio clip at any location in the source audio file based on the target insertion location; furthermore, based on the target insertion location and the playback duration corresponding to the audio clip, the audio clip can be spliced at any location in the source audio file through the switching points on the basis of retaining the source audio file, so that the audio clip and the source audio file corresponding to the source multimedia file can be seamlessly played during playing the spliced and latest source audio file on the intelligent terminal, thus solving the cumbersome method of realizing audio file splicing under the existing technology.

In some arrangements, the intelligent terminal, after obtaining the spliced and latest source audio file, may also perform the following operations on the latest source audio file based on its satisfaction with the latest source audio file.

Operation 1: the intelligent terminal determines an audio clip to be cancelled in response to a cancellation operation.

In the arrangements of the present disclosure, the intelligent terminal can obtain the audio clip to be cancelled by responding to the cancellation operation after obtaining the latest source audio file.

Operation 2: the intelligent terminal switches playing from the audio clip to be cancelled to playing the source audio file corresponding to the source multimedia file.

In the arrangements of present disclosure, after determining any one audio clip to be cancelled, the intelligent terminal can switch from playing the audio clip to playing the source audio file corresponding to the source multimedia file, so as to obtain any one of the latest source audio files in any version that meets the user's requirements.

Figure 17:
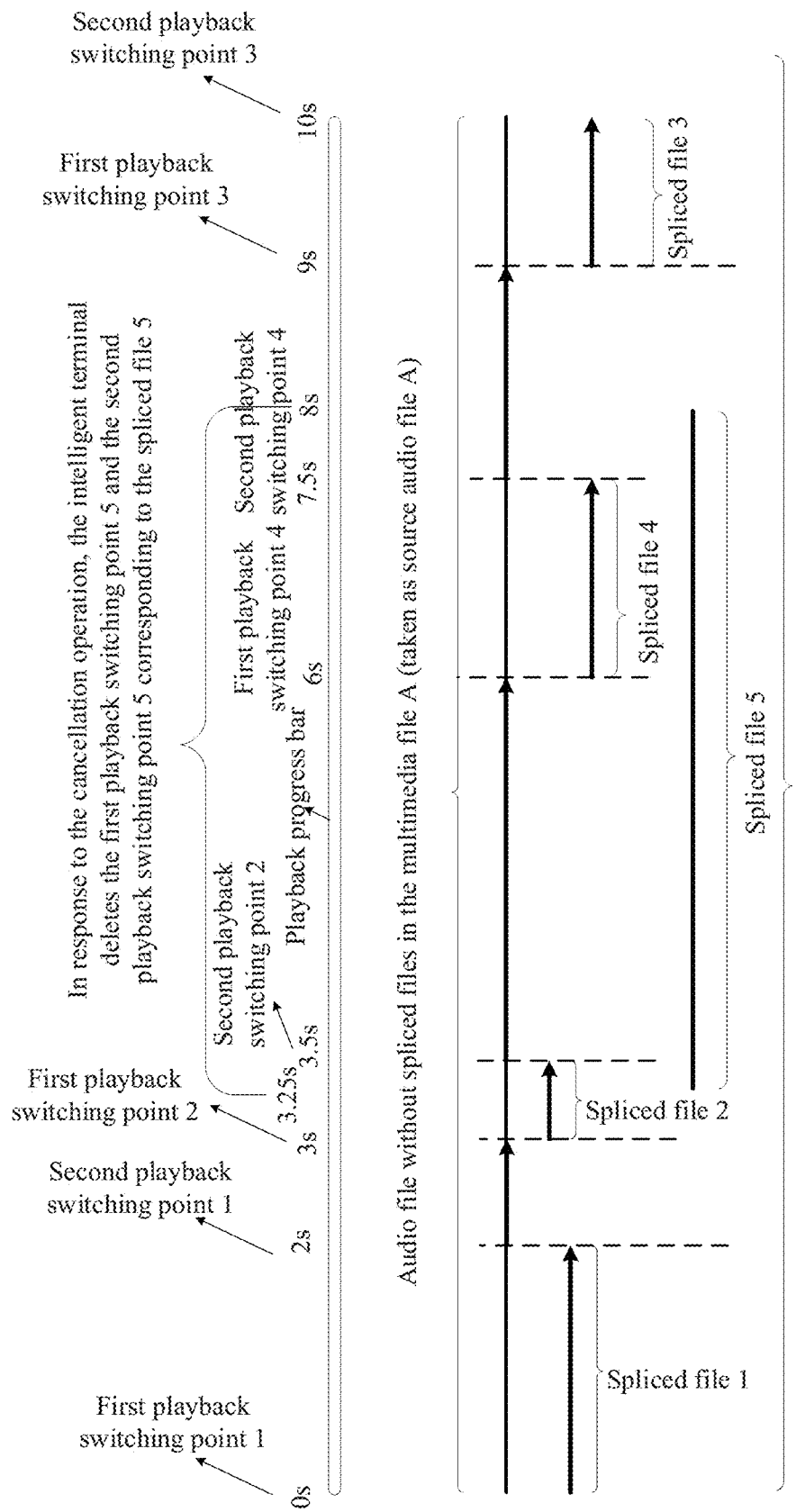
FIG. 17 is a schematic diagram illustrating an application scenario of the intelligent terminal responding to a cancellation operation according to some arrangements of the present disclosure.

For example, as illustrated in FIG. 17, the multimedia file A is still taken as an example of a short video.

It is still assumed that the total playback duration of multimedia file A is 10 s (e.g., the end moment is 10 s), the spliced file is over-writable, and the audio file of the multimedia file A without the spliced file is taken as the source audio file A.

It is also assumed that the spliced and latest source audio file has been obtained by the intelligent terminal, where the first playback switching point 1 for spliced file 1 is 0 s, and the second playback switching point 1 for spliced file 1 is 2 s; the first playback switching point 2 for spliced file 2 is 3 s; the first playback switching point 5 for spliced file 5 is 3.25 s, and the second playback switching point 5 for spliced file 5 is 8 s; and the first playback switching point 3 for spliced file 3 is 9 s, and the second playback switching point 3 for spliced file 3 is 10 s.

Furthermore, it is assumed that the intelligent terminal receives the cancellation operation command to determine that the spliced file 5 needs to be cancelled, where the insertion time of the spliced file 5 is later than the insertion time of the spliced file 2 and the spliced file 4, and the playback duration of the spliced file 5 overwrites part of the spliced file 2 and all of the spliced file 4.

Then, the intelligent terminal, in response to the cancellation operation, determines that the audio file to be cancelled is spliced file 5, and then the intelligent terminal, during playing the latest source audio file, plays spliced file 1 upon reaching the first playback switching point 1 (e.g., 0 s), and goes to source audio file A and starts playing source audio file A upon reaching the second playback switching point 2 (e.g., 2 s).

Upon playing to the first playback switching point 2 (e.g. 3 s), the intelligent terminal goes from source audio file A to spliced file 2 and starts playing the spliced file 2, and upon playing to the second playback switching point 2 (e.g. 3.5 s), it goes from the spliced file 2 to the source audio file A and starts playing the source audio file A.

Upon playing to the first playback switching point 4 (e.g. 6 s), the intelligent terminal goes from source audio file A to the spliced file 4 and starts playing the spliced file 4; and upon playing to the second playback switching point 4 (e.g. 7.5 s), it goes from the spliced file 4 to the source audio file A and starts playing the source audio file A.

Upon playing to the first playback switching point 3 (e.g. 9 s), the intelligent terminal goes from source audio file A to the spliced file 3 and starts playing the spliced file 3, and stop playing when it reaches the second playback switching point 3 (e.g. 10 s).

Figure 18:
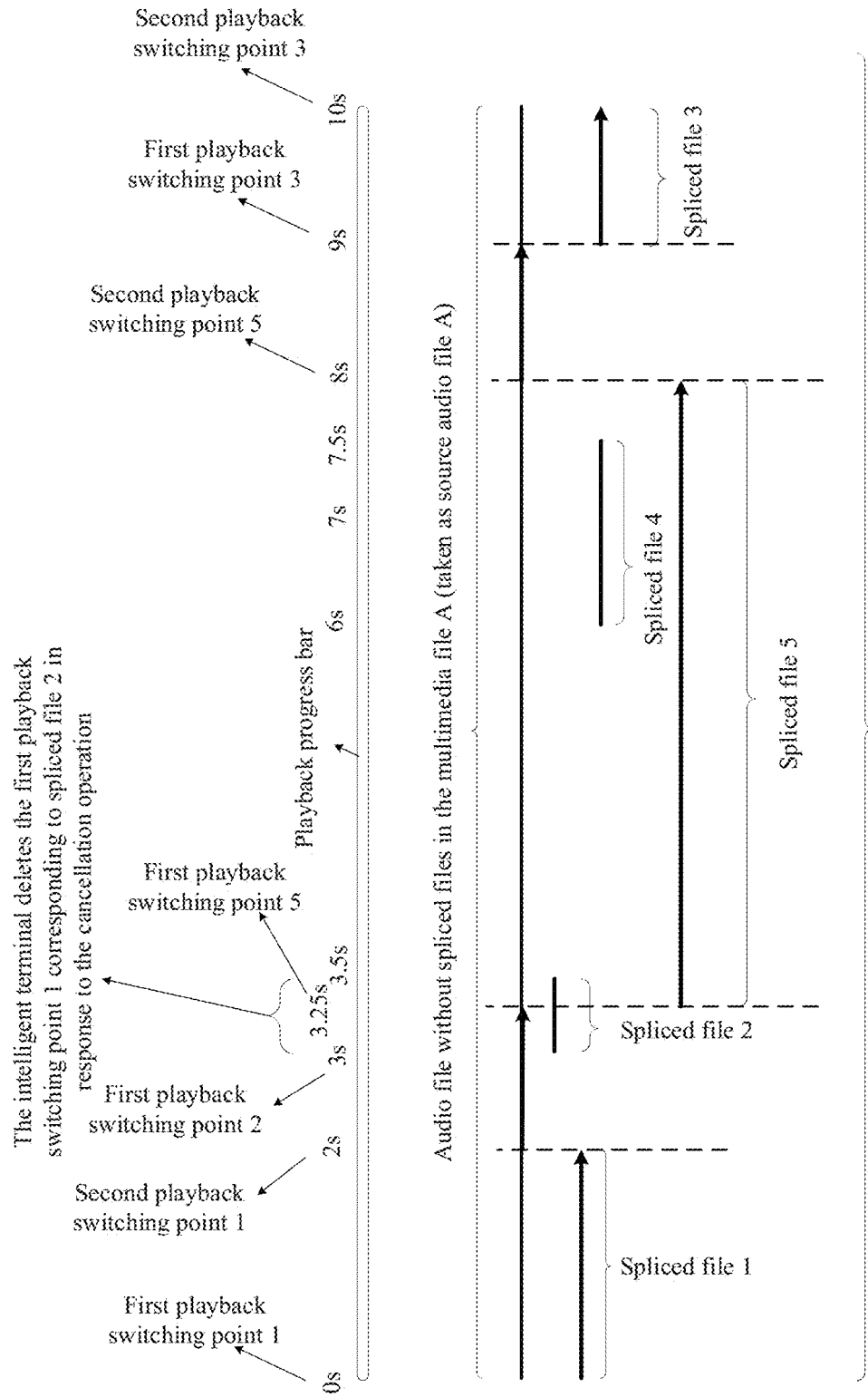
FIG. 18 is a schematic diagram illustrating an application scenario of the intelligent terminal responding to a cancellation operation according to some arrangements of the present disclosure.

In some arrangements, as illustrated in FIG. 18, the multimedia file A is still taken as an example of a short video.

It is still assumed that the total playback duration of multimedia file A is 10 s (e.g., the end moment is 10 s), the spliced file is over-writable, and the audio file of the multimedia file A without the spliced file is taken as the source audio file A.

It is also assumed that the spliced and latest source audio file has been obtained by the intelligent terminal, where the first playback switching point 1 for spliced file 1 is 0 s, and the second playback switching point 1 for spliced file 1 is 2 s; the first playback switching point 2 for spliced file 2 is 3 s; the first playback switching point 5 for spliced file 5 is 3.25 s, and the second playback switching point 5 for spliced file 5 is 8 s; and the first playback switching point 3 for spliced file 3 is 9 s, and the second playback switching point 3 for spliced file 3 is 10 s.

It is also assumed that the intelligent terminal receives the cancellation operation command to determine that the spliced file 2 needs to be cancelled, where the insertion time of the spliced file 2 is earlier than the insertion time of the spliced file 5, and the spliced file 2 is partially overwritten by the playback duration of the spliced file 5.

Then, the intelligent terminal, in response to the cancellation operation, determines that the audio file to be cancelled is spliced file 2, and then the intelligent terminal, during playing the latest source audio file, plays spliced file 1 upon reaching the first playback switching point 1 (e.g., 0 s), and goes to source audio file A and starts playing source audio file A upon reaching the second playback switching point 1 (e.g., 2 s).

Upon playing to the first playback switching point 5 (e.g. 3.25 s), the intelligent terminal goes from source audio file A to the spliced file 5 and starts playing the spliced file 5; and upon playing to the second playback switching point 5 (e.g. 8 s), it goes from the spliced file 5 to the source audio file A and starts playing the source audio file A.

Upon playing to the first playback switching point 3 (e.g. 9 s), the intelligent terminal goes from source audio file A to the spliced file 3 and starts playing the spliced file 3, and stop playing when it reaches the second playback switching point 3 (e.g. 10 s).

In this way, by using the method described in the arrangements of present disclosure, the intelligent terminal can realize smooth jumping between the source audio file and at least one spliced file, thus achieving the goal of inserting the spliced file at any location in the source audio file corresponding to source multimedia file on the basis of retaining the source audio file, furthermore, a cancellation operation can be performed randomly when the cancellation operation is encountered, thus satisfying the user's requirement for the diversity for inserting audio files.

Figure 19:
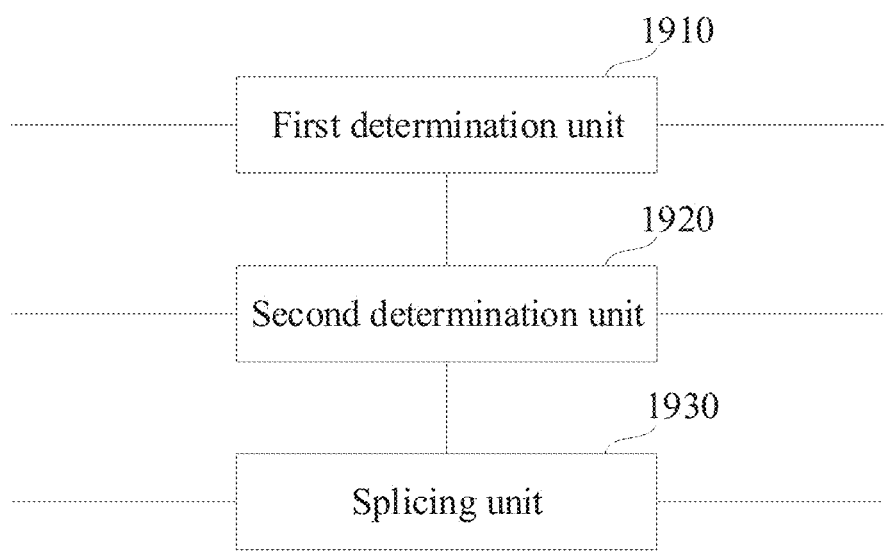
FIG. 19 is a schematic diagram of a logical architecture of an apparatus for splicing an audio file according to some arrangements of the present disclosure.

Based on the same inventive concept, there is provided an apparatus for splicing an audio file (e.g., an intelligent terminal) in the arrangements of the present disclosure, referring to FIG. 19, which includes a first determination unit 1910, configured to determine a target insertion location in a source multimedia file in response to an insertion operation, a second determination unit 1920, configured to obtain an audio clip corresponding to the insertion operation and determine a playback duration corresponding to the audio clip, and a splicing unit 1930, configured to insert, based on the target insertion location and the playback duration, a playback switching point to a source audio file, where the playback switching point is configured to switch playback between the source audio file and the audio clip during playing the source multimedia file.

In some arrangements, the second determination unit 1920 is configured to obtain the audio clip by obtaining the audio clip based on local audio data or obtaining recorded audio data in response to a recording operation as the audio clip.

In some arrangements, the second determination unit 1920 is configured to obtain the recorded audio data in response to the recording operation as the audio clip by determining a maximum recording duration of the recorded audio data based on the target insertion location and the source audio file, starting recording in response to the recording operation, stopping recording based on the maximum recording duration, or stopping recording in response to a stop recording operation, and obtaining the recorded audio data as the audio clip.

In some arrangements, the second determination unit 1920 is further configured to disable the insertion operation in response to the source audio file corresponding to the target insertion location being a spliced file and the spliced file being not over-writable.

In some arrangements, the second determination unit 1920 is configured to determine the maximum recording duration of the recorded audio data by determining a duration between the target insertion location and a start moment of first one spliced file after the target insertion location, as the maximum recording duration of the recorded audio data.

In some arrangements, the splicing unit 1930 is further configured to switch, at a first playback switching point, from playing the source audio file corresponding to the source multimedia file to playing the audio clip based on the target insertion location, and switching, at a second playback switching point, from playing the audio clip to playing the source audio file based on the audio clip having played for the playback duration.

In some arrangements, the splicing unit 1930 is further configured to determine an audio clip to be cancelled in response to a cancellation operation and switch playing from the audio clip to be cancelled to playing the source audio file.

Figure 20:
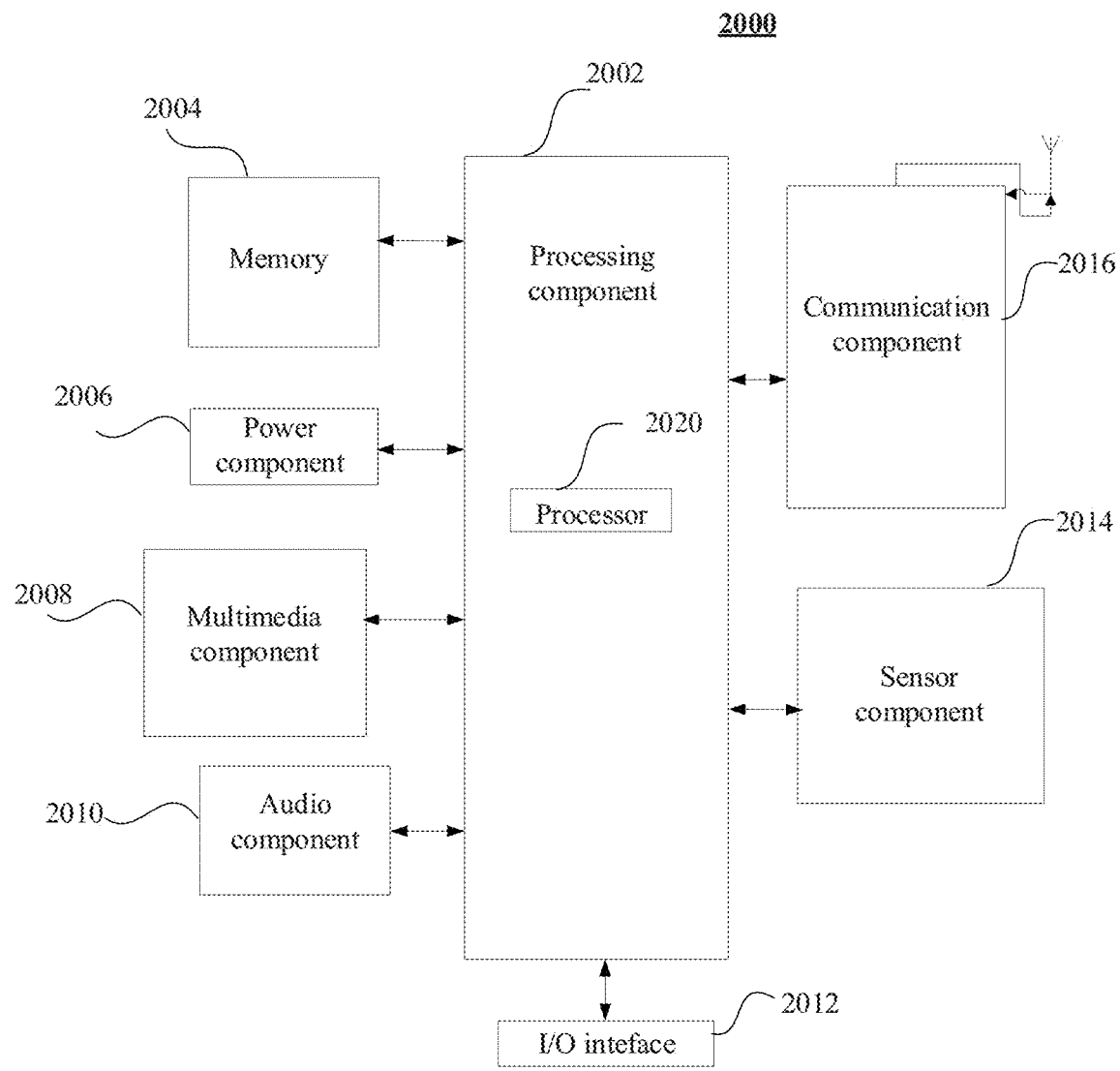
FIG. 20 is a schematic diagram of a physical architecture of a device for splicing an audio file according to some arrangements of the present disclosure.

Based on the same inventive concept, referring to FIG. 20, there is provided a computer device in the arrangements of the present application, for example, the electronic device 2000 may be a cell phone, a computer, a digital broadcast terminal, a message sending and receiving device, a game console, a tablet device, a medical device, a fitness device, a personal digital assistant, and the like.

Referring to FIG. 20, the electronic device 2000 may include one or more of the following components: a processing component 2002, a memory 2004, a power component 2006, a multimedia component 2008, an audio component 2010, an input/output (I/O) interface 2012, a sensor component 2014, and a communication component 2016.

The processing component 2002 typically controls the overall operation of the electronic device 2000, such as operations associated with display, phone call, data communication, camera operation, and recording operations. The processing component 2002 may include one or more processors 2020 to execute instructions to complete all or some of the steps of the method described above. In addition, the processing component 2002 may include one or more modules that facilitate interaction between processing component 2002 and other components. For example, processing component 2002 may include a multimedia module to facilitate interaction between multimedia component 2008 and processing component 2002.

The memory 2009 is configured to store various types of data to support operation at the electronic device 2000. Examples of such data include instructions for any application or method of operation on the electronic device 2000, contact data, phonebook data, messages, images, videos, etc. The memory 2004 can be implemented by any type of transitory or non-transitory storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or CD.

The power component 2006 provides power to the various components of the electronic device 2000. The power component 2006 may include a power management system, one or more power supplies, and other components associated with generating, managing, and distributing power for the electronic device 2000.

The multimedia component 2008 includes a screen providing an output interface between the electronic device 2000 and the user. In some arrangements, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some arrangements, the multimedia component 2008 includes a front-facing camera and/or a rear-facing camera. The front camera and/or rear camera can receive external multimedia data when the electronic device 2000 is in an operating mode, such as shooting mode or video mode. Each front camera and rear camera may be a fixed optical lens system or have focal length and optical zoom capability.

The audio component 2010 is configured to output and/or input audio signals. For example, the audio component 2010 includes a microphone (MIC) configured to receive external audio signals when the electronic device 2000 is in an operating mode, such as call mode, recording mode, and voice recognition mode. The received audio signal may be further stored in memory 2004 or sent via communication component 2016. In some arrangements, the audio component 2010 further includes a speaker for outputting audio signals.

The I/O interface 2012 provides an interface between the processing component 2002 and a peripheral interface module, the peripheral interface module may be a keyboard, click wheel, button, etc. These buttons may include, but are not limited to: a home button, a volume button, a start button, and a lock button.

The sensor component 2014 includes one or more sensors for providing status assessment of various aspects of the electronic device 2000. For example, the sensor component 2014 may detect an open/closed state of the electronic device 2000, the relative positioning of components, such as the components being the display and keypad of the electronic device 2000, the sensor component 2014 may also detect a change in position of the electronic device 2000 or a component of the electronic device 2000, the presence or absence of user contact with the electronic device 2000, the orientation or acceleration/deceleration of the electronic device 2000 and temperature changes of the electronic device 2000. The sensor component 2014 may include a proximity sensor configured to detect the presence of a nearby object in the absence of any physical contact. The sensor component 2014 may also include a light sensor, such as a CMOS or CCD image sensor, for use in imaging applications. In some arrangements, the sensor component 2014 may also include an accelerometer sensor, a gyroscope sensor, a magnetic sensor, a pressure sensor, or a temperature sensor.

The communication component 2016 is configured to facilitate communication between the electronic device 2000 and other devices by wired or wireless connections.

The electronic device 2000 may access a wireless network based on a communication standard, such as WiFi, a carrier network (e.g., 2G, 3G, 4G, or 5G), or a combination thereof. In one exemplary arrangement, communication component 2116 receives broadcast signals or broadcast-related information from an external broadcast management system via a broadcast channel. In an exemplary arrangement, the communication component 2016 further comprises a near-field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In exemplary arrangements, the electronic device 2000 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing any of the methods performed by the computer device in above arrangements.

Based on the same inventive concept, arrangements of the present disclosure provide a computer-readable storage medium capable of executing any of the methods executed by the computer device in the above arrangements when the instructions in the computer-readable storage medium are executed by a processor.

Based on the same inventive concept, arrangements of the present disclosure provide a computer program product including executable instructions that, when the executable instructions of the computer program product are executed by a processor, are capable of implementing any of the methods performed by the computer device as in the above arrangements.

In summary, in the arrangements of the present disclosure, the intelligent terminal responds to the insertion operation and determines the target insertion location; then determines the playback duration corresponding to the audio clip based on the obtained audio clip; further, based on the target insertion location and the playback duration, the playback switching between the source audio file corresponding to the source multimedia file and the audio clip is performed to obtain the spliced and latest source audio file. In this way, the intelligent terminal can achieve the purpose of inserting the audio clip at any location of the source audio file on the basis of retaining the source audio file, thus satisfying the user's requirement for audio diversity and improving the user's experience satisfaction of the intelligent terminal, which in turn also solves the problem that the recorded audio file cannot be spliced with the source audio file randomly under the existing technology.

In addition, based on the target insertion location and the playback duration corresponding to the audio clip, the intelligent terminal sets switching points in the source audio file corresponding to the source multimedia file, e.g., a virtual cropping method, instead of real cropping of the source audio file corresponding to the source multimedia file, so that when playing the spliced and latest source audio file, free jumping between the audio clip and the source audio file is achieved through the playback switching points, thus achieving a seamless playback between the inserted audio and the source audio; in turn, if the intelligent terminal needs to perform a cancellation operation on the spliced source audio file, the cancellation operation can be realized by deleting the playback switching point corresponding to the spliced file, thus saving time and reducing the complexity of the operation.

Those skilled in the art should understand that arrangements of the present disclosure may be provided as methods, systems, or computer program products. Accordingly, the present disclosure may take the form of an entirely hardware arrangement, an entirely software arrangement, or an arrangement combining software and hardware aspects. Further, the present disclosure may take the form of a computer program product implemented on one or more computer-usable storage media (including, but not limited to, disk memory, CD-ROM, optical memory, etc.) that contains computer-usable program code therein.

The present disclosure is described with reference to flowcharts and/or block diagrams of methods, devices (systems), and computer program products according to arrangements of the present disclosure. It should be understood that each process and/or box in the flowchart and/or block diagram, and the combination of processes and/or boxes in the flowchart and/or block diagram, may be implemented by computer program instructions. These computer program instructions may be provided to a processor of a general-purpose computer, a specialized computer, an embedded processor, or other programmable data processing device to produce a machine such that instructions executed by the processor of the computer or other programmable data processing device produce a device for implementing a function specified in one or more processes of the flowchart and/or one or more boxes of the block diagram.

These computer program instructions may also be stored in a computer readable memory capable of directing the computer or other programmable data processing apparatus to operate in a particular manner such that the instructions stored in the computer readable memory produce an article of manufacture comprising an instruction device that implements the function specified in the flowchart one process or a plurality of processes and/or the block diagram one box or a plurality of boxes.

These computer program instructions may also be loaded onto a computer or other programmable data processing device such that a series of operational steps are performed on the computer or other programmable device to produce computer-implemented processing such that the instructions executed on the computer or other programmable device provide steps for implementing the functions specified in the flowchart one process or a plurality of processes and/or the block diagram one box or a plurality of boxes.

Although preferred arrangements of the present disclosure have been described, those skilled in the art may make additional changes and modifications to these arrangements once the underlying creative concepts are known. Therefore, the appended claims are intended to be construed to include the preferred arrangements and all changes and modifications that fall within the scope of the present disclosure.

Obviously, a person skilled in the art can make various changes and variations to arrangements of the present disclosure without departing from the spirit and scope of the arrangements of the present disclosure. Thus, if these modifications and variations of arrangements of the present disclosure fall within the scope of the claims of the present disclosure and their technical equivalents, the present disclosure is also intended to encompass such modifications and variations.

What is claimed is:

1. A method for splicing an audio file, comprising:
   determining a target insertion location in a source multimedia file in response to an insertion operation;
   obtaining an audio clip corresponding to the insertion operation;
   determining a playback duration corresponding to the audio clip;
   inserting, based on the target insertion location and the playback duration, a playback switching point to a source audio file corresponding to the source multimedia file, wherein the playback switching point is configured to switch playback between the source audio file and the audio clip during playing the source multimedia file;
   switching, at a first playback switching point, from playing the source audio file to playing the audio clip based on the target insertion location;
   determining an audio clip to be cancelled in response to a cancellation operation; and
   switching playing from the audio chip to be cancelled to playing the source audio file.

2. The method of claim 1, wherein said obtaining the audio clip comprises:
   obtaining the audio clip based on local audio data; or
   obtaining recorded audio data in response to a recording operation as the audio clip.

3. The method of claim 2, wherein said obtaining the recorded audio data in response to the recording operation as the audio clip, comprises:
   determining a maximum recording duration of the recorded audio data based on the target insertion location and the source audio file;
   starting recording in response to the recording operation;
   stopping recording based on the maximum recording duration, or stopping recording in response to a stop recording operation; and
   obtaining the recorded audio data as the audio clip.

4. The method of claim 3, wherein said determining the maximum recording duration of the recorded audio data, comprises:
   determining a duration between the target insertion location and a start moment of first one spliced file after the target insertion location as the maximum recording duration of the recorded audio data.

5. The method of claim 2, further comprising:
   disabling the insertion operation in response to the source audio file corresponding to the target insertion location being a spliced file and the spliced file being not overwritable.

6. The method of claim 1, further comprising:
   switching, at a second playback switching point, from playing the audio clip to playing the source audio file based on the audio clip having played for the playback duration.

7. The method of claim 1, wherein the source audio file has an overlapping playback period with the audio clip.

8. A computer device, comprising:
   a memory configured to store an executable instruction; and
   a processor configured to read and execute the executable instruction stored in the memory to:
      determine a target insertion location in a source multimedia file in response to an insertion operation;
      obtain an audio clip corresponding to the insertion operation;
      determine a playback duration corresponding to the audio clip;
      insert, based on the target insertion location and the playback duration, a playback switching point to a source audio file corresponding to the source multimedia file, wherein the playback switching point is configured to switch playback between the source audio file and the audio clip during playing the source multimedia file;

switch, at a first playback switching point, from playing the source audio file to playing the audio clip based on the target insertion location;

determine an audio clip to be cancelled in response to a cancellation operation; and switch playing from the audio chip to be cancelled to playing the source audio file.

9. The computer device of claim 8, wherein the processor is configured to obtain the audio clip by:

obtaining the audio clip based on local audio data; or obtaining recorded audio data in response to a recording operation as the audio clip.

10. The computer device of claim 9, wherein the processor is configured to obtain the recorded audio data in response to the recording operation as the audio clip by:

determining a maximum recording duration of the recorded audio data based on the target insertion location and the source audio file;

starting recording in response to the recording operation;

stopping recording based on the maximum recording duration, or stopping recording in response to a stop recording operation; and obtaining the recorded audio data as the audio clip.

11. The computer device of claim 10, wherein the processor is configured to determine the maximum recording duration of the recorded audio data by:

determining a duration between the target insertion location and a start moment of first one spliced file after the target insertion location as the maximum recording duration of the recorded audio data.

12. The computer device of claim 9, wherein the processor is further configured to:

disable the insertion operation in response to the source audio file corresponding to the target insertion location being a spliced file and the spliced file being not overwritable.

13. The computer device of claim 8, wherein the processor is further configured to:

switch, at a second playback switching point, from playing the audio clip to playing the source audio file based on the audio clip having played for the playback duration.

14. The computer device of claim 8, wherein the source audio file has an overlapping playback period with the audio clip.

15. A non-transitory computer readable storage medium, wherein an instruction stored in the computer readable storage medium, when executed by a processor, cause the processor to:

determine a target insertion location in a source multimedia file in response to an insertion operation;

obtain an audio clip corresponding to the insertion operation;

determine a playback duration corresponding to the audio clip;

insert, based on the target insertion location and the playback duration, a playback switching point to a source audio file corresponding to the source multimedia file, wherein the playback switching point is configured to switch playback between the source audio file and the audio clip during playing the source multimedia file;

switch, at a first playback switching point, from playing the source audio file to playing the audio clip based on the target insertion location;

determine an audio clip to be cancelled in response to a cancellation operation; and switch playing from the audio chip to be cancelled to playing the source audio file.

16. The non-transitory computer readable storage medium of claim 15, wherein the source audio file has an overlapping playback period with the audio clip.

* * * * *